US012228274B2

(12) United States Patent
Hu

(10) Patent No.: US 12,228,274 B2
(45) Date of Patent: Feb. 18, 2025

(54) LOW GLARE FIXTURE

(71) Applicant: Wangs Alliance Corporation, Port Washington, NY (US)

(72) Inventor: Dunping Hu, Blaine, MN (US)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/407,778

(22) Filed: Jan. 9, 2024

(65) Prior Publication Data

US 2025/0027639 A1 Jan. 23, 2025

Related U.S. Application Data

(60) Provisional application No. 63/527,398, filed on Jul. 18, 2023.

(51) Int. Cl.
*F21V 29/507* (2015.01)
*F21V 15/01* (2006.01)
(Continued)

(52) U.S. Cl.
CPC ............ *F21V 29/507* (2015.01); *F21V 15/01* (2013.01); *F21V 29/713* (2015.01); *F21Y 2115/10* (2016.08)

(58) Field of Classification Search
CPC ....... F21V 29/507; F21V 29/713; F21V 15/01
See application file for complete search history.

(56) References Cited

U.S. PATENT DOCUMENTS 7,387,402 B1 * 6/2008 Lui (Phillip) ......... F21V 17/164 362/180
8,106,569 B2 * 1/2012 Gershaw .............. A61B 1/0653 362/345
(Continued)

FOREIGN PATENT DOCUMENTS

| | | |
|---|---|---|
| CN | 104428580 | 3/2015 |
| GB | 2531383 | 4/2016 |

(Continued)

OTHER PUBLICATIONS

"Ocularc 2.0 11W 0° -35° Adjustable Round," https://www.waclighting.com/product/ocularc-2-0-4/, WAC Lighting, 2019.
(Continued)

*Primary Examiner* — Bryon T Gyllstrom
(74) *Attorney, Agent, or Firm* — Weiss & Arons LLP

(57) ABSTRACT

Apparatus and methods for lighting. The apparatus may include a retention body. The retention body may be retained in a housing. The apparatus may include a rotatable body. The rotatable body along with the retention body may define a central axis. The rotatable body may rotate relative to the retention body. The apparatus may include an articulating body. The articulating body may include a light emitting diode ("LED") light source. The articulating body may tilt relative to the rotatable body. In operation the LED light source may generate heat. The housing, the retention body, the rotatable body and the articulating body may dissipate the heat. The housing, the retention body, the rotatable body and the articulating body may dissipate the heat so that the housing has a surface temperature that does not a predetermined maximum surface temperature.

26 Claims, 31 Drawing Sheets

(51) Int. Cl.

| | |
|---|---|
| ***F21V 29/71*** | (2015.01) |
| ***F21Y 115/10*** | (2016.01) |

(56) References Cited

U.S. PATENT DOCUMENTS

| | | | | |
|---|---|---|---|---|
| 8,926,133 | B2 | 1/2015 | Booth | |
| 10,174,891 | B1 | 1/2019 | Zheng et al. | |
| 10,234,091 | B1 | 3/2019 | Chaimberg et al. | |
| 10,247,390 | B1 | 4/2019 | Kopitzke, IV | |
| 10,344,952 | B2 * | 7/2019 | Georgiev | F21V 17/12 |
| 10,920,964 | B2 * | 2/2021 | Vidakovic | F21V 14/02 |
| 11,226,087 | B2 | 1/2022 | Wickham et al. | |
| 11,274,815 | B1 * | 3/2022 | Sure | F21V 5/007 |
| 11,402,081 | B1 * | 8/2022 | Hargroder | F21V 29/70 |
| 11,428,398 | B1 * | 8/2022 | Portinga | F21V 29/74 |
| 11,441,768 | B1 * | 9/2022 | Portinga | F21V 29/73 |
| 11,466,848 | B1 | 10/2022 | Portinga et al. | |
| 11,492,138 | B2 * | 11/2022 | Sanga | G10L 15/22 |
| 2017/0184285 | A1 * | 6/2017 | Visser | F21V 23/008 |
| 2017/0314750 | A1 | 11/2017 | Feldman | |
| 2020/0300445 | A1 * | 9/2020 | Fujisawa | F21V 21/30 |
| 2023/0100581 | A1 | 3/2023 | Cohen | |
| 2023/0111632 | A1 | 4/2023 | Cohen et al. | |
| 2023/0146822 | A1 | 5/2023 | Hierzer | |

FOREIGN PATENT DOCUMENTS

| | | |
|---|---|---|
| KR | 10-2018-0024692 | 3/2018 |
| WO | WO2010/097733 | 9/2010 |

OTHER PUBLICATIONS

"Ocularc 2,0 9W 0° -35° Adjustable Square," www.waclighting.com/product/oculare-2-0-6/, WAC Lighting, 2017.

"Installation Instruction Aether 2 Shallow Recessed Housing HR-2LED-H13A," WAC Lighting, Dec. 2021.

"Installation Instruction Aether 3.5 Shallow Recessed Housing HR-3LED-H17A," WAC Lighting, Mar. 6, 2018.

* cited by examiner

2904

LOW GLARE FIXTURE

CROSS-REFERENCE TO RELATED APPLICATIONS

In This is a non-provisional of U.S. Provisional Application No. 63/527,398, filed on Jul. 18, 2023, which is hereby incorporated by reference in its entirety.

BACKGROUND

In operation, light emitting diode ("LED") light sources generate heat. Typically, LED fixtures are designed to dissipate heat through different components included in the fixture. Typically, heat dissipation occurs through direct contact regions between the different components. However, when the LED fixture is tiltable, there may no longer be sufficient contact regions between the components to maintain the fixture at an acceptable temperature. According to standards, such as the Electrical Installation Condition Report code and the National Fire Protection Association 70 National Electric Code, there are specific temperature limits of the fixture that are required for fixtures to be installed without requiring extra thermal protection, such as a external casing or additional insulation.

It would therefore be desirable to provide apparatus and methods for a tiltable lighting assembly. It also would be desirable to provide apparatus and methods for a tiltable lighting assembly that maintains adequate heat dissipation without additional thermal protection.

Figure 1:
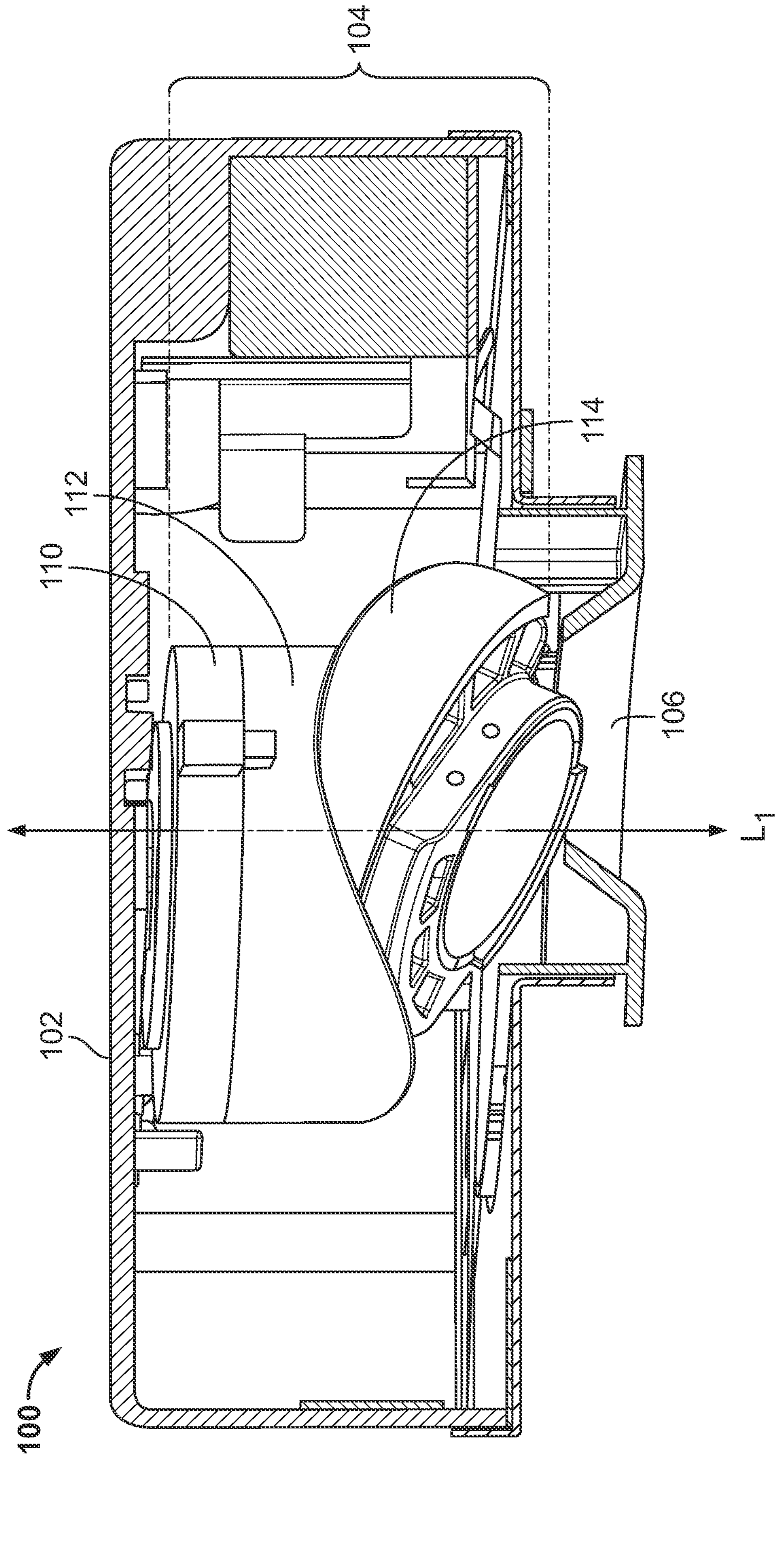
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DESCRIPTION

Apparatus and methods for lighting are provided.

The apparatus may include a fixture. The fixture may include a housing. The fixture may include a light engine assembly. The light engine assembly may include a retention body. The retention body may be retained in a housing. The light engine assembly may include a rotatable body. The rotatable body along with the retention body may define a central axis. The rotatable body may rotate relative to the retention body. The light engine assembly may include an articulating body. The articulating body may include a light source. The light source may be a light-emitting diode ("LED") light source. The light source may include one or more LEDs. The articulating body may tilt relative to the rotatable body. The articulating body may tilt relative to the central axis.

The retention body, rotatable body and articulating body may include a material. Table 1 lists illustrative materials.

TABLE 1

| Illustrative materials. |
|---|
| Illustrative materials. |
| Aluminum |
| Bronze |
| Copper |
| Brass |
| Steel |
| Stainless Steel |
| An alloy of the above materials |
| Other suitable materials |

The retention body, rotatable body and articulating body may include any suitable material. The retention body, rotatable body and articulating body may together form a light engine assembly. The retention body may be fastened to the rotatable body. The rotatable body may be fastened to the articulating body.

In operation, the LED light source may generate heat. In operation the housing and the lighting assembly may conduct heat. "Conduction," as used herein may refer to thermal conduction. The housing may dissipate the heat. The housing may absorb the heat. The housing may disperse heat emitted by the LED light source. The light engine assembly may dissipate the heat. The light engine assembly may absorb the heat. The light engine assembly may disperse the heat emitted by the LED light source. Because of heat dissipation from the light engine assembly and the housing, the housing may have a surface temperature that does not exceed a predetermined maximum surface temperature. Table 2 lists illustrative temperature ranges that may include the predetermined maximum surface temperature.

TABLE 2

Illustrative surface temperature ranges.

| Illustrative surface temperature ranges |
| --- |
| <75° C. |
| 75° C.-80° C. |
| 80° C.-85° C. |
| 85° C.-90° C. |
| 90° C.-95° C. |
| 85° C.-100° C. |
| >100° C. |
| Any other suitable surface temperature ranges |

The housing and the light engine assembly may be constructed and arranged to disperse the heat in such a way that the surface temperature of the housing does not exceed the predetermined maximum surface temperature. The heat generated by the LED may be dispersed so that the surface temperature of the housing does not exceed the predetermined maximum surface temperature when installed and in operation. Therefore, the fixture may be a fixture that does not require additional thermal protection, such as an external casing, insulation, or other suitable thermal protection. As such the fixture may meet one or more standards such as the Electrical Installation Condition Report code and National Fire Protection Association 70 National Electric Code. In operation, the LED light source may have a nominal operating power.

Table 3 lists nominal operating power ranges of the LED light source that may include the nominal operating power.

TABLE 3

Nominal operating power ranges of the LED light source.

| Nominal operating powers |
| --- |
| <10 W |
| 10 W-11 W |
| 11 W-12 W |
| 12 W-13 W |
| 13 W-14 W |
| 14 W-15 W |
| 15 W-16 W |
| >16 W |
| Any other suitable power ranges |

The articulating body may include a bottom surface. "Surface," as used herein may refer to a surface that include holes, tracks, and any other suitable cutouts. The articulating body may include a top surface. The articulating body may include a first contact region. The first contact region may be in contact with the rotatable body. The first contact region may include contact between the top surface of the articulating body and a bottom surface of the rotatable body.

The rotatable body may include a top surface. The rotatable body may include a second contact region. The second contact region may be in contact with the retention body. The second contact region may include contact between the top surface of the articulating body and a bottom surface of the retention body.

The retention body may include a top surface. The retention body may include a third contact region. The third contact region may be in contact with the housing. The third contact region may include contact between the top surface of the retention body and an inside surface of the housing.

The top surface of the articulating body may include a surface that is cylindrical. The top surface of the articulating body may include a surface that is spherical. The top surface of the articulating body may include a surface that is toroidal. The top surface of the articulating body may include a surface that has any suitable shape.

The top surface of the articulating body may have a convex shape. The convex shape may be convex in a direction facing opposite a direction of light propagation from the LED light source. The convex shape may be convex in a direction facing the direction of light propagation. The bottom surface of the rotatable body may include a surface that is converse a surface of the articulating body. The shape of the bottom surface of the rotatable body may complement the shape of the top surface of the articulating body The top surface of the articulating body may be keyed to the bottom surface of the rotatable body.

The articulating body may be tiltable. The articulating body may be tiltable relative to the central axis. Table 4 lists illustrative tilt angle ranges that may include the tilt range of the articulating body.

TABLE 4

Illustrative tilt angle ranges that may include the tilt range of the articulating body.

| Illustrative tilt angle ranges |
| --- |
| 0°-15° |
| 0°-30° |
| 0°-45° |
| 0°-60° |
| 0°-75° |
| 0°-90° |
| Any other suitable angle ranges |

The articulating body may enable tilting of the light engine assembly. The rotatable body may include a keyway. The articulating body may be fitted into the keyway with keys. The keys may be slidable along the keyway.

The rotatable body may include one or more keyways. Each keyway may include a cutout in the rotatable body. The articulating body may include one or more keys. Each key may correspond to a keyway. A key may include a screw. A key may include a screw bearing. The screw bearing may be included in the keyway. The screw bearing may include plastic. The bearing may include any suitable bearing material. The screw bearing may enable the key to slide along the keyway. The screw bearing may provide enough lubricity for a user to tilt the articulating body to a new position, and enough friction to retain the articulating body in the new position. Each key may be screwed into the articulating body through a keyway in the rotatable body. Each key may slide along a keyway. Each key may slide along a keyway in response to a user sliding the articulating body.

The articulating body may have a non-tilted state. The non-tilted state may correspond to a state in which the entire top surface of the articulating body is in contact with the bottom surface of the rotatable body. The articulating body may have a maximally-tilted state. The maximally-tilted state may correspond to a tilt of 30° in relation to the central axis.

Tilting the articulating body from the non-tilted state to the maximally-tilted state may reduce interfacial contact between the articulating body and the rotatable body by no more than a maximum predetermined percentage. Table 5 lists illustrative percentage ranges that may include the maximum predetermined percentage.

TABLE 5

Illustrative percentage ranges that may include the maximum predetermined percentage.

| Illustrative percentage ranges that may include the maximum predetermined percentage. |
|---|
| <30% |
| 30%-40% |
| 40%-50% |
| 50%-60% |
| 60%-70% |
| 70%-80% |
| >80% |
| Any other suitable percentage ranges |

In a non-tilted state, the top surface of the articulating body may be in contact with 100% of the bottom surface of the rotatable body. In a maximally tilted state, the top surface of the articulating body may be in contact with a percentage of the bottom surface of the rotatable body. Table 6 shows illustrative percentage ranges that may include the percentage of the top surface of the articulating body that is in contact with the bottom surface of the rotatable body when the articulating body is in a maximally-tilted state.

TABLE 6

Illustrative percentage ranges that may include the percentage of the top surface of the articulating body that is in contact with the bottom surface of the rotatable body when the articulating body is in a maximally-tilted state.

| Illustrative percentage ranges that may include the percentage of the top surface of the articulating body that is in contact with the bottom surface of the rotatable body when the articulating body is in a maximally-tilted state |
|---|
| <30% |
| 30%-40% |
| 40%-50% |

TABLE 6-continued

Illustrative percentage ranges that may include the percentage of the top surface of the articulating body that is in contact with the bottom surface of the rotatable body when the articulating body is in a maximally-tilted state.

| |
|---|
| 50%-60% |
| 60%-70% |
| 70%-80% |
| >80% |
| Any other suitable percentage ranges |

As the articulating body is being tilted from a non-tilted state to a maximally-tilted state the percentage of interfacial contact between the top surface of the articulating body and the bottom surface of the rotatable body may decrease This may preserve some thermal contact between the articulating body and the rotatable body across the range of tilt angles.

The rotatable body may be rotatable. The rotatable body may be rotatable by up to 360°. The rotatable body may be rotatable by up to 360° about the central axis. The rotatable body may be rotatable by movement of a handle attached to the articulating body.

The articulating body may rotate along with the rotatable body. Precluding the tilting, the articulating body may be fixed with respect to rotation relative to the rotatable body. The rotatable body may be a rotatable body that rotates up to a maximum rotation angle about the central axis. The rotatable body may be a rotatable body that does not rotate more than the maximum rotation angle about the central axis. Table 7 lists illustrative rotation angle ranges that may include the maximum angle of rotation of the rotatable body.

TABLE 7

Illustrative rotation angle ranges that may include the maximum angle of rotation of the rotatable body.

| Illustrative rotation angle ranges that may include the maximum angle of rotation of the rotatable body. |
|---|
| <90° |
| 90°-180° |
| 180°-270° |
| 270°-360° |
| Any other suitable angle ranges |

The rotatable body may be moveable by a user. The articulating body may include a handle. The handle may be moveable from a stowed position to an accessible position. In the stowed position the handle may not be rotatable. In the accessible position the handle may be rotatable about the central axis. Rotation of the handle may cause the articulating body to rotate. Rotation of the articulating body may cause the rotatable body to rotate. The retention body may remain stationary when the rotatable body is rotated. The retention body may not be rotatable when the rotatable body is rotated.

The retention body and the rotatable body may be fastened by a threaded rod and a nut. The retention body and the rotatable body may be connected by any suitable connector. The rotatable body may include a center cutout. The center cutout may enable the threaded rod to pass through the rotatable body. The threaded rod may include a rim. The diameter of the rim may be greater than the diameter of the center cutout. The rim may prevent the threaded rod from disengaging with the rotatable body. The threaded rod may enable the rotatable body to rotate about the central axis. The threaded rod my not fix the rotatable body in place. The threaded rod may enable the rotatable body to rotate around the threaded rod. The retention body may include a corresponding center cutout. The corresponding center cutout may enable the threaded rod to pass through the retention body. The retention body may include a removed portion around the center cutout. The removed portion may enable the nut to be fastened to the threaded rod. A washer may be disposed under the nut.

A percentage of contact area of a surface of the rotatable body and a surface of the retention body may remain constant with rotation of the rotatable body. The top surface of the rotatable body may remain in constant contact with the bottom surface of the retention body when the light engine assembly is assembled.

One of the retention body and the rotation body may include a ridge, the other may include a groove. The ridge may extend circumferentially around the bottom surface of the retention body. The top surface of the rotatable body may include a groove. The groove may correspond to the ridge. The groove may fit the ridge. The ridge may align the retention body with the rotatable body. The ridge may stabilize the retention body with respect to the rotatable body.

The light engine assembly may be magnetically docked to the housing. The light engine may be removable from the housing. The light engine assembly may be removable from the housing via a translation of the light engine assembly along the central axis. The retention body may be removable from the housing. The retention body may include a magnetic material. The top surface of the retention body may include the magnetic material.

Table 8 lists illustrative magnetic materials that may be included in the retention body.

TABLE 8

Illustrative magnetic materials that may be included in the retention body.

| Illustrative magnetic materials |
| --- |
| Permanent magnet |
| Electromagnet |
| Temporary magnet |
| Ferromagnetic material |
| Paramagnetic material |
| Diamagnetic material |
| Other suitable magnetic materials |

The retention body may be magnetically docked to the housing. As such, the retention body may remain stationary as the rotatable body along with the articulating body rotates around the threaded rod.

The threaded rod may include a center bore. The center bore may serve as a conduit. The fixture may include power leads. The power leads may transfer power from a power source to the LED light source. The power leads may transfer power through one or more wires. The power leads may be disposed through the conduit in order to transfer power from the power source to the LED light source. The power leads may connect to an LED holder. The LED holder may include contacts. The contacts may contact the LED light source. The contacts may enable power to be transferred from the power leads to the LED light source. The power leads may be disposed in a cable sleeve. The cable sleeve may protect the power leads from damage from chafing from rotation of the rotatable body. The cable sleeve may protect the power leads from transmitting heat to external components of the light engine assembly.

Power leads to the light source may include a connector. The connector may enable the light engine to be disconnected from power source after the light engine assembly is separated from the housing. The power leads may be connected to the LED light source in the light engine assembly. The connector may be a modular connector. The connector may be any suitable connector. The connector may be disposed in the retention body. The connector may connect to the housing. The connector may enable the transmission of power from the power source to the LED light source.

The LED light source may be enclosed in the articulating body. The articulating body may receive the heat generated from the LED light source. The articulating body may transfer the heat to the rotatable body across the first contact region. The rotatable body may receive the heat from the articulating body. The rotating body may transfer the heat to the retention body across the second contact region. The retention body may receive the heat from the rotatable body. The retention body may transfer the heat to the housing across the third contact region at any tilt angle. The retention body may transfer the heat to the housing through a thermally conductive intermediary that is disposed between the retention body and the housing.

The articulating body, the rotatable body, the retention body and the housing may function as heat dissipators. The articulating body, the rotatable body, the retention body and the housing may dissipate heat generated by the LED light source. The articulating body, the rotatable body, the retention body and the housing may be constructed and arranged such that even when the articulating body is in a tilted position, an outer surface of the fixture does not exceed the predetermined maximum surface temperature when the LED light source is in operation.

When the articulating body is in the maximally-tilted state, the first contact region may be smaller than when the articulating body is in the not-tilted state. Even when the first contact region is smaller, heat may be transferred from the articulating body to the rotatable body. The LED light source may be disposed in the articulating body such that when the articulating body is in the maximally-tilted state, the LED light source still has a direct path of thermal contact with the rotatable body. The LED light source may be disposed in a part of the articulating body that always remains in contact with the bottom surface of the rotatable body, irrespective of the tilt angle of the articulating body.

The fixture may be mounted in an architectural structure. The housing may be installed in the structure. The architectural structure may include structural support. The architectural structure may include a panel. The panel may include plaster, sheet rock, wood or any other suitable material. The fixture may be mounted to the structural support on one side of the panel.

The light source may emit a beam that propagates through a hole in the panel. The light engine assembly may be detachable from the rest of the fixture. The light engine assembly may pass through the hole.

The fixture may include trim. The trim may have a round shape. The trim may be tapered. The trim may have a maximum outer diameter. The trim may include a diameter that may gradually decrease in size. Table 9 lists illustrative ranges that may include the maximum outer diameter of the trim.

TABLE 9

| Illustrative ranges that may include the maximum outer diameter of the trim. |
| --- |
| Illustrative ranges that may include the maximum diameter of the trim |
| <1.5 inches |
| 1.5 inches-2 inches |
| 2 inches-2.5 inches |
| 2.5 inches-3 inches |
| 3 inches-3.5 inches |
| 3.5 inches-4 inches |
| 4 inches-4.5 inches |
| 4.5 inches-5 inches |
| >5 inches |
| Other suitable diameter ranges |

The trim may define an aperture. The aperture may be a round aperture. The aperture may be a tapered aperture. The aperture may have a maximum outer diameter. The aperture may include a diameter that may gradually decrease in size. Table 10 lists illustrative ranges that may include the maximum outer diameter of the aperture.

TABLE 10

| Illustrative ranges that may include the maximum outer diameter of the aperture. |
| --- |
| Illustrative ranges that may include the maximum diameter of the aperture. |
| <0.5 inches |
| 0.5 inches-1 inch |
| 1 inch-1.5 inches |
| 1.5 inches-2 inches |
| 2 inches-2.5 inches |
| 2.5 inches-3 inches |
| 3 inches-3.5 inches |
| 3.5 inches-4 inches |
| >4 inches |
| Other suitable diameter ranges |

The trim may have a rectangular shape. The trim may be tapered. The trim may have an outer diagonal with a maximum length. The trim may include a diagonal that may gradually decrease in size. Table 11 lists illustrative ranges that may include the maximum outer diagonal of the trim.

TABLE 11

| Illustrative ranges that may include the maximum outer diagonal of the trim. |
| --- |
| Illustrative ranges that may include the maximum diagonal of the trim |
| <1.5 inches |
| 1.5 inches-2 inches |
| 2 inches-2.5 inches |
| 2.5 inches-3 inches |
| 3 inches-3.5 inches |
| 3.5 inches-4 inches |
| 4 inches-4.5 inches |
| 4.5 inches-5 inches |
| >5 inches |
| Other suitable diagonal ranges |

The trim may define an aperture. The aperture may be a rectangular aperture. The aperture may be a tapered aperture. The aperture may have an outer diagonal with a maximum length. The aperture may include a diagonal that may gradually decrease in size. Table 12 lists illustrative ranges that may include the maximum outer diagonal of the aperture.

TABLE 12

| Illustrative ranges that may include the maximum outer diagonal of the aperture. |
| --- |
| Illustrative ranges that may include the maximum diagonal of the aperture. |
| <0.5 inches |
| 0.5 inches-1 inch |
| 1 inch-1.5 inches |
| 1.5 inches-2 inches |
| 2 inches-2.5 inches |
| 2.5 inches-3 inches |
| 3 inches-3.5 inches |
| 3.5 inches-4 inches |
| >4 inches |
| Other suitable diagonal ranges |

The trim may have any other suitable shape. The aperture may have any other suitable shape. The trim may be removable from the housing. The trim may be a trim that includes a lens. The trim may be a trim that does not include a lens.

The housing may be a shallow housing. The light engine assembly may be shorter than the height of the housing. The light engine may not be visible when placed into the housing. The light engine assembly may be shorter than the housing to enable the placement of the trim. The trim may be a deep trim.

The housing and the trim together may have a height. Table 13 lists illustrative height ranges for the housing and the trim together that may include the height of the housing and the trim together.

TABLE 13

| Illustrative height ranges that may include the height of the housing and the trim together. |
| --- |
| Illustrative height ranges |
| <2.21 inches |
| 2.21 inches-2.31 inches |
| 2.31 inches-2.41 inches |
| 2.41 inches-2.51 inches |
| 2.51 inches-2.61 inches |
| 2.61 inches-2.71 inches |
| 2.71 inches-2.81 inches |
| >2.81 inches |
| Other suitable height ranges |

The housing may have a height. Table 14 lists illustrative height ranges that may include the height of the housing.

TABLE 14

| Illustrative height ranges that may include the height of the housing. |
| --- |
| Illustrative height ranges |
| <1.73 inches |
| 1.73 inches-1.83 inches |
| 1.83 inches-1.93 inches |
| 1.93 inches-2.03 inches |
| 2.03 inches-2.13 inches |
| 2.13 inches-2.23 inches |
| 2.23 inches-2.33 inches |

TABLE 14-continued

| Illustrative height ranges that may include the height of the housing. |
|---|
| >2.33 inches |
| Other suitable height ranges |

The trim may have a height. Table 15 lists illustrative height ranges that may include the height of the trim.

TABLE 15

Illustrative height ranges that may include the height of the trim.

| Illustrative height ranges |
|---|
| <0.16 inches |
| 0.16 inches-0.21 inches |
| 0.21 inches-0.26 inches |
| 0.26 inches-0.31 inches |
| 0.31 inches-0.36 inches |
| 0.36 inches-0.41 inches |
| 0.41 inches-0.46 inches |
| >0.46 inches |
| Other suitable height ranges |

Table 16 lists illustrative ranges that may include the ratio of the height of the housing to the depth of the trim.

TABLE 16

Illustrative ranges of the ratio of the housing height to the trim depth.

| Illustrative ranges (height: depth) |
|---|
| 6-6.275 |
| 6.275-6.5 |
| 6.5-6.725 |
| 6.725-7 |
| Other suitable ranges |

The deep trim may prevent glare from the LED light source. The depth of trim may mitigate glare from the light emitted by the LED light source. Table 17 lists illustrative ranges that may include the ratio of the depth of trim to the length of the diameter of the aperture of the trim.

TABLE 17

Illustrative ranges of the ratio of the trim depth to the trim aperture diameter.

| Illustrative ranges (depth: length) |
|---|
| 0.01-0.05 |
| 0.05-0.1 |
| 0.1-0.15 |
| 0.15-0.2 |
| 0.2-0.25 |
| 0.25-0.3 |
| Other suitable ranges |

The light engine assembly may be rotatable when the trim is attached to the housing. The handle may be accessible to a user even when the trim is attached to the housing.

The apparatus may include a LED driver. The LED driver may include a controller. The controller may be configured to provide dimming to the fixture. The controller may be configured to provide color control to the fixture. The color control may include mixing of light from LEDs of different colors. The colors may include one or more of red, green, blue, violet, and white of one or more correlated color temperatures ("CCTs"), and any other suitable color. The controller may provide one or more dim-to-warm curves. The curves may correlate a color of the LEDs, such as a mixed white color, with a dimming level.

In some embodiments, the apparatus may include a fixture. The fixture may include a housing. The fixture may include a light engine assembly. The light engine assembly may be magnetically docked to the housing. The light engine assembly may be removable from the housing. The light engine assembly may be removable from the housing via a translation of the lighting assembly along the central axis.

The fixture may include trim. In a cross-sectional view transverse to the central axis, the trim may have a round shape. In a cross-sectional view transverse to the central axis, the trim may have a rectangular shape. In a cross-sectional view transverse to the central axis, the trim may have any other suitable shape. The trim may be removable from the housing. The trim may be a trim that includes a lens. The trim may be a trim that does not include a lens.

The light engine assembly may include a light source. The light source may include one or more LEDs. The light source may emit a beam that propagates through a hole in the panel. The light engine assembly may be detachable from the rest of the fixture. The light engine assembly may pass through the hole.

The housing may disperse heat emitted by the LED light source. The light engine assembly may serve as a heat sink. The light engine base may absorb the heat emitted by the LED. An adjustable segment of the light engine assembly may serve as the heat sink. A fixed segment and a rotatable segment of the light engine assembly may further dissipate the heat. The heat may be dissipated when the adjustable segment is in an adjusted position. The housing may also dissipate heat. With a combination of the hosing and the light engine assembly, the heat dissipated by the fixture may not reach over 90° C.

The light engine assembly may be adjustable. The light engine assembly may be adjustable from 0° to 30°. The light engine assembly may be adjustable by a sliding of the adjustable segment of the light engine assembly. The adjustable segment may include a key way. The adjustable segment may be fitted into the key way with keys. The keys may be translatable along the key way.

The light engine assembly may be rotatable. The light engine assembly may include a rotatable segment. The light engine assembly may be rotatable by up to 360°. The light engine assembly may be rotatable by movement of a handle attached to the light engine assembly. The light engine assembly may be rotated around the central axis. The light engine assembly may be rotatable when the trim is attached to the housing. The handle may be accessible to a user even when the trim is attached to the housing.

The light engine assembly may be docked in the housing. The housing may include a housing coupler. The housing coupler may be affixed to the housing. The housing coupler may include a magnetic material. The magnetic material may include a permanent magnet. The magnetic material may include ferromagnetic material. The magnetic material may include electromagnetic material. The magnetic material may include any suitable type of magnetic material. The light engine assembly may include a docking ring. The docking ring include magnetic material. The magnetic material may include a permanent magnet. The magnetic material may include ferromagnetic material. The magnetic material may include electromagnetic material. The magnetic material may include any suitable type of magnetic material. The light engine assembly may be magnetically docked within the housing.

The light engine assembly may include a rotatable segment. The rotatable segment may be rotatable around a central axis. The rotatable segment may rotatable up to 360°.

The rotatable segment may be rotatable in the direction of $c^+$. The rotatable segment may be rotatable in the direction of $c^-$. The rotatable segment may be rotated by a user. The light engine assembly may include a fixed segment. The light engine assembly may include an adjustable segment. The adjustable segment may be adjustable from 0° to 30°. The adjustable segment may be adjustable from any other suitable angle. The adjustable segment may include an LED light source. The adjustable segment may include a lens. The lens may propagate light emitted by the LED light source. Angle of beam propagation a may be adjusted with a sliding of the adjustable segment.

Illustrative embodiments of apparatus and methods in accordance with the principles of the invention will now be described with reference to the accompanying drawings, which forma part hereof. It is to be understood that other embodiments may be utilized and that structural, functional and procedural modifications, additions or omissions may be made without departing from the scope and spirit of the present invention.

FIG. 1 shows a partial cross-sectional view of illustrative lighting fixture 100. Fixture 100 may include light engine assembly 104. Light engine 104 may include articulating body 114. Light engine assembly 104 may include rotatable body 112. Light engine assembly 104 may include retention body 110. Fixture 100 may include housing 102. Housing 102 may include trim 106. Light engine assembly 104 may define central axis $L_1$.

Figure 2:
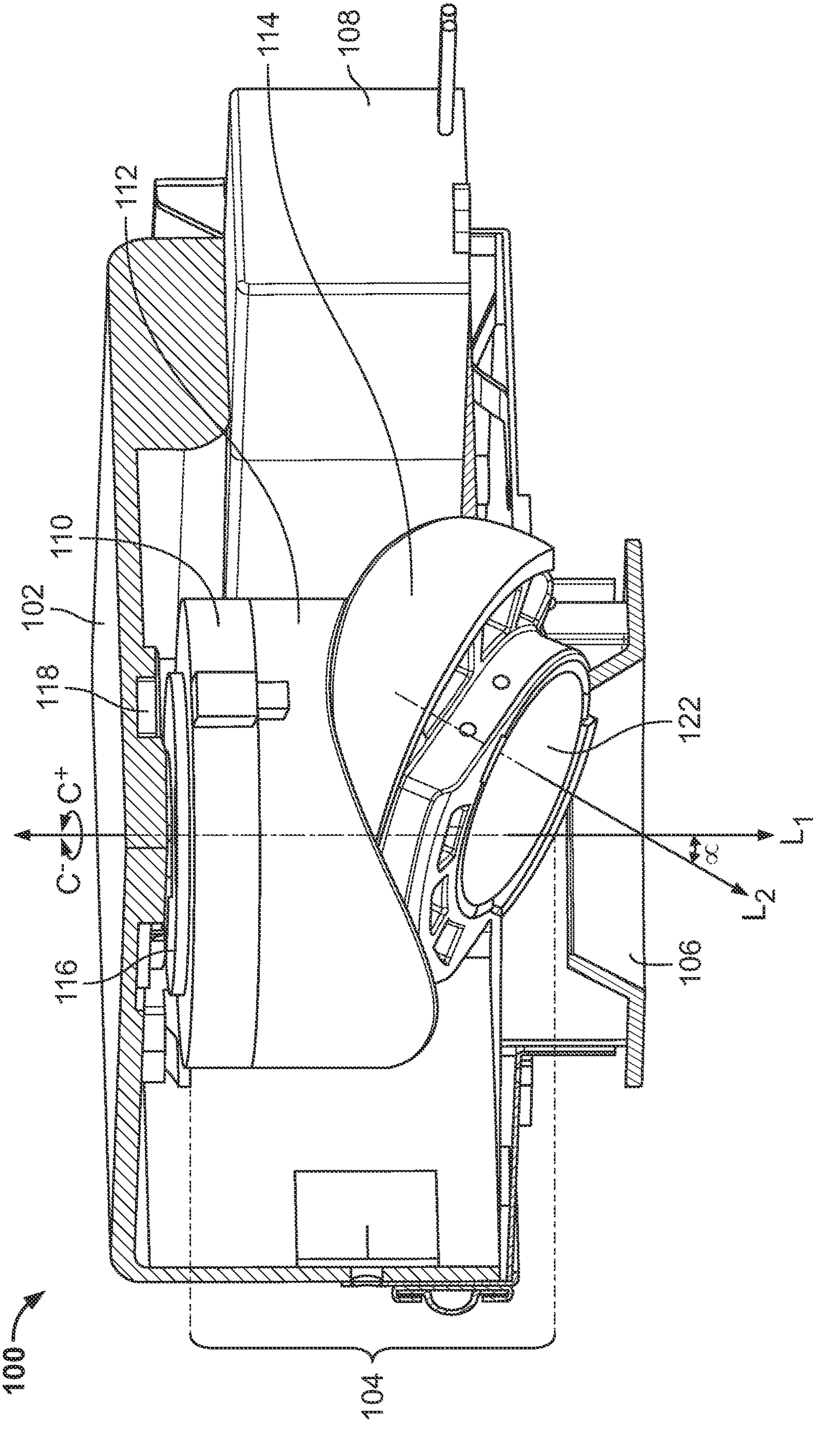
FIG. 2 shows schematically illustrative apparatus in accordance with the principles of the invention.

FIG. 2 shows light engine assembly 104 docked in housing 102. Light engine assembly 104 may be removably docked to housing 102. Housing 102 may include housing coupler 118. Housing coupler 118 may be fixed to housing 102. Retention body 110 may include ring 116. Housing coupler 118 may include a magnetic material. Ring 116 may include a magnetic material.

Ring 116 may be magnetically dockable to housing coupler 118. Light engine assembly 104 may be removable from housing 102 by a linear force. The linear force may be a force along axis $L_1$. The linear force may be a force applied by a user.

Rotatable body 112 may be rotatable about axis $L_1$. Rotatable body 112 may be rotatable in the direction of $c^+$. Rotatable body 112 may be rotatable in the direction of $c^-$. Articulating body 114 may be rotated about axis $L_1$ along with rotatable body 112. Retention body 110 may be a body that may not be rotatable about axis $L_1$. Articulating body 114 may be tiltable. Articulating body 114 may be tilted at angle $\alpha$. Angle $\alpha$ may be defined by the intersection of central axis $L_1$ and axis $L_2$. Axis $L_2$ may be defined by the tilt of articulating body 114.

Light engine assembly 104 may include an LED light source (not shown). The LED light source may be configured to emit light. The LED light source may be disposed in articulating body 114. Articulating body 114 may include reflector 122. The LED light source may propagate light through reflector 122. Housing 102 may be mounted in the architectural structure. Housing 102 may be mounted in the panel. Housing 102 may be mounted on one side of the panel. The LED light source may emit a beam of light that propagates through trim 106 to the other side of the panel.

Housing 102 may house LED driver 108. LED driver 108 may provide power to the LED light source. LED driver 108 may include the lighting controller. LED driver 108 may be connected to a power supply (not shown). LED driver 108 may power the LED light source from the power supply. The power supply may be disposed in housing 102. The power supply may be disposed outside of housing 102.

Figure 3:
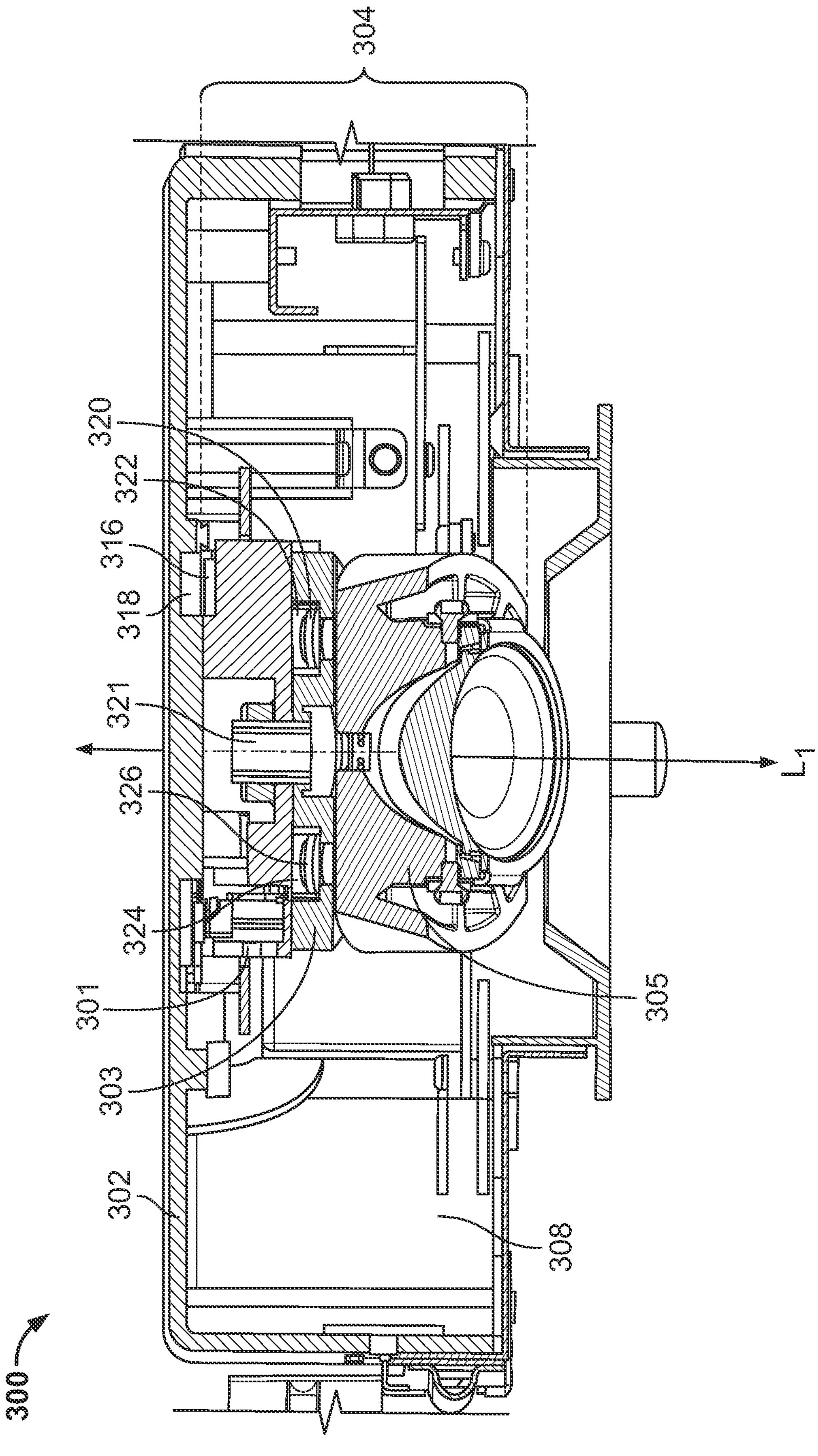
FIG. 3. schematically illustrative apparatus in accordance with the principles of the invention.

FIG. 3 shows a partial cross-sectional view of illustrative lighting fixture 300. Fixture 300 may include one or more features in common with fixture 100. Retention body 301 and articulating body 305 may include a center cutout. The center cutout may define power conduit 321. When light engine assembly 304 is docked to housing 302 via the coupling of ring 316 to housing coupler 318, power conduit 321 may enable power to be transferred to the LED light source. Power conduit 321 may enable the transfer of power through power lines connected to LED driver 308.

Rotatable body 303 may include keyways 322 and 324. Keyways 322 and 324 may each define an elongated cutout. Articulating body 305 may include keys 320 and 326. Keys 320 and 326 may be screwed into articulating body 305. Keys 320 and 326 may be screwed into articulating body 305 through the cutouts defined by keyways 322 and 324 respectively. Keys 320 and 326 may fasten rotatable body 303 to articulating body 305. Keys 320 and 326 may include clearance relative to keyways 322 and 324 to enable the sliding of articulating body along the keyways 322 and 324. Sliding articulating body along keyways 322 and 324 may enable the tilting of the articulating body.

Figure 4:
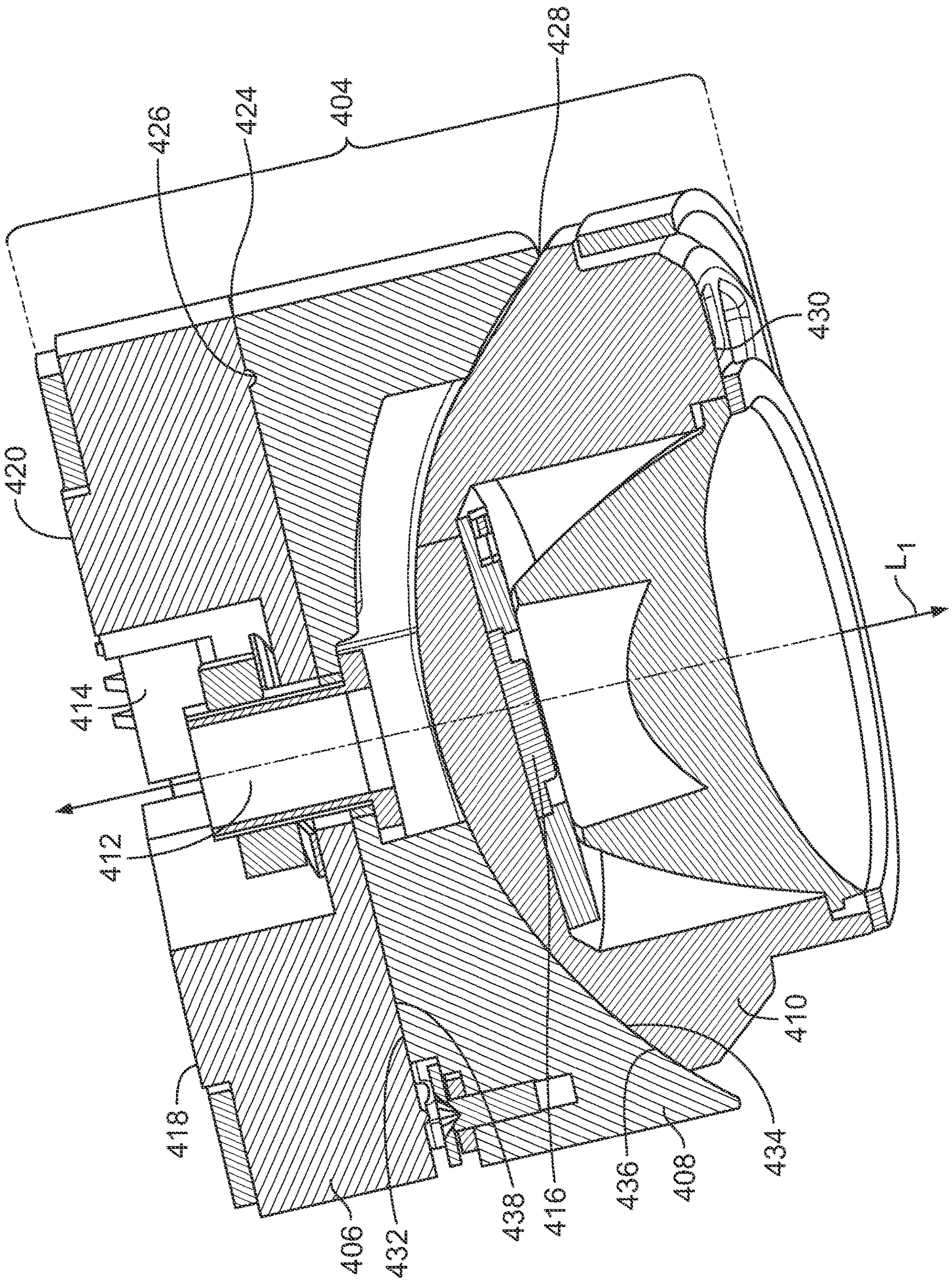
FIG. 4 shows schematically illustrative apparatus in accordance with the principles of the invention.

FIG. 4 shows a cross sectional view of light engine assembly 404. Light engine assembly 404 may include one or more features in common with one or more of light engine assembly 104 and light engine assembly 304.

Retention body 406 may include connector 414. Connector 414 may be modular connector. Connector 414 may be any suitable connector. Connector 414 may enable the transfer of power through power leads that are disposed through power conduit 412 and connected to LED light source 416. The power leads may connect to LED light source 416 through a cutout in articulating body 410. Connector 414 may enable the transfer of power through connecting the power leads to a LED driver such as is shown in fixture 100 and 300. Connector 414 may automatically disconnect LED light source 416 from power when the light engine assembly is removed from a housing such as shown in fixture 100 and 300.

Articulating body 410 may include bottom surface 430. Articulating body 410 may include top surface 434. Rotatable body 408 may include bottom surface 436. Bottom surface 436 and top surface 434 may contact at first contact region 428. Rotatable body 408 may include top surface 438. Retention body 406 may include bottom surface 432. Bottom surface 432 and top surface 438 may contact at second contact region 424. Retention body 406 may include top surface 418. Top surface 418 may contact the housing. Top surface 418 may contact the housing at third contact region 420.

Retention body 406 may include ridge 426. Ridge 426 may extend circumferentially around bottom surface 432. Ridge 426 may align retention body 406 with rotatable body 408. Ridge 426 may stabilize retention body 406 with rotatable body 408.

Top surface 434 may have a hemispherical shape. The shape of bottom surface 436 may be converse that of top surface 434. The shape of bottom surface 436 may complement the shape of top surface 434.

When articulating body 410 slides along keyways included in rotatable body 408, because of the curvature of the surface, articulating body 410 may tilt. When top surface 434 is in full contact with bottom surface 436, the articulating body may be tilted 0° relative to central axis $L_1$.

Figure 5:
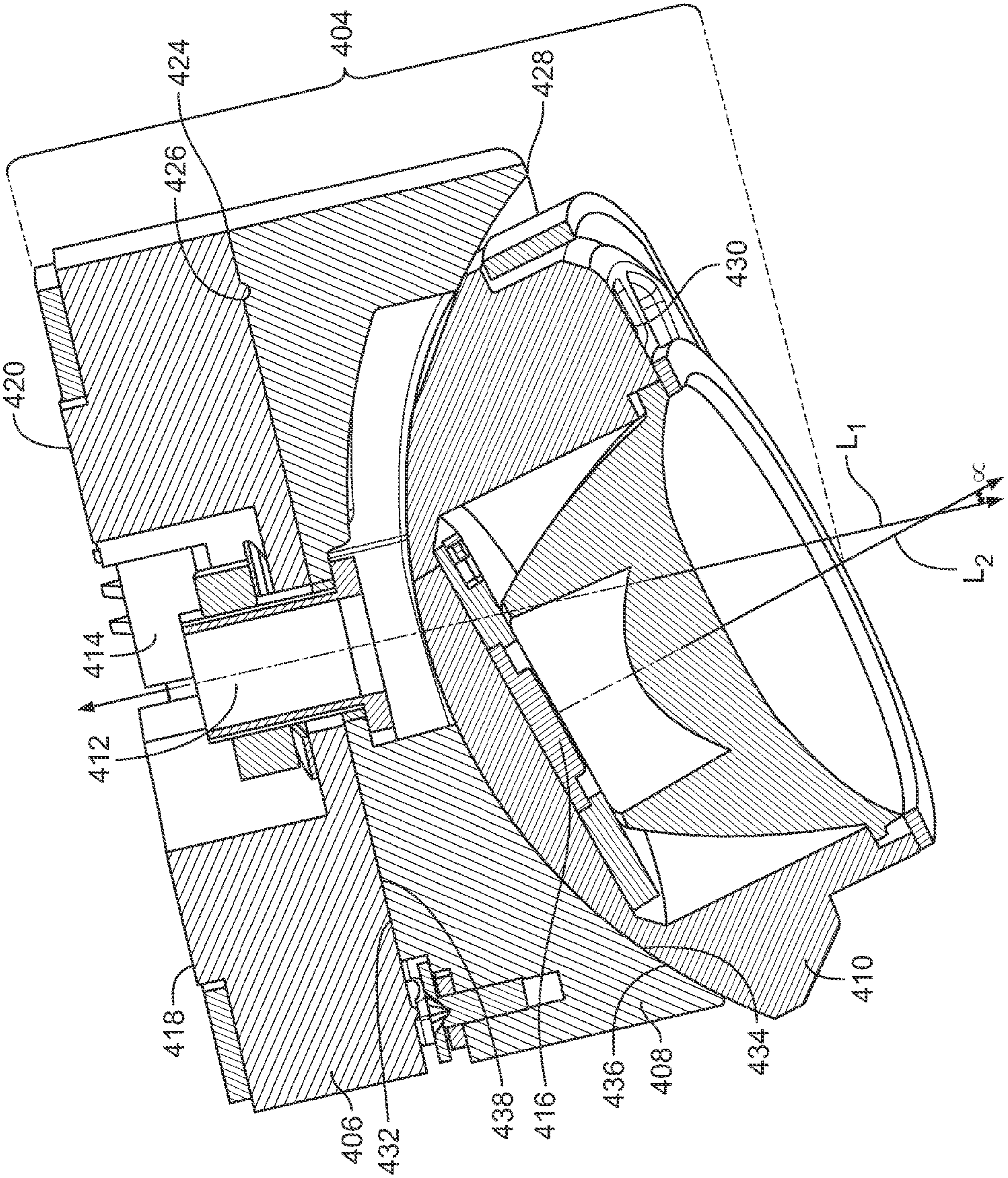
FIG. 5 shows schematically illustrative apparatus in accordance with the principles of the invention.

FIG. 5 shows light engine assembly 404 in which articulating body 410 is tilted at angle $\alpha$. Angle $\alpha$ may be a 15° angle. When articulating body 410 is tilted at angle $\alpha$, a percentage of top surface 434 may contact bottom surface 436. Illustrative percentages are listed in Table 6.

Figure 6:
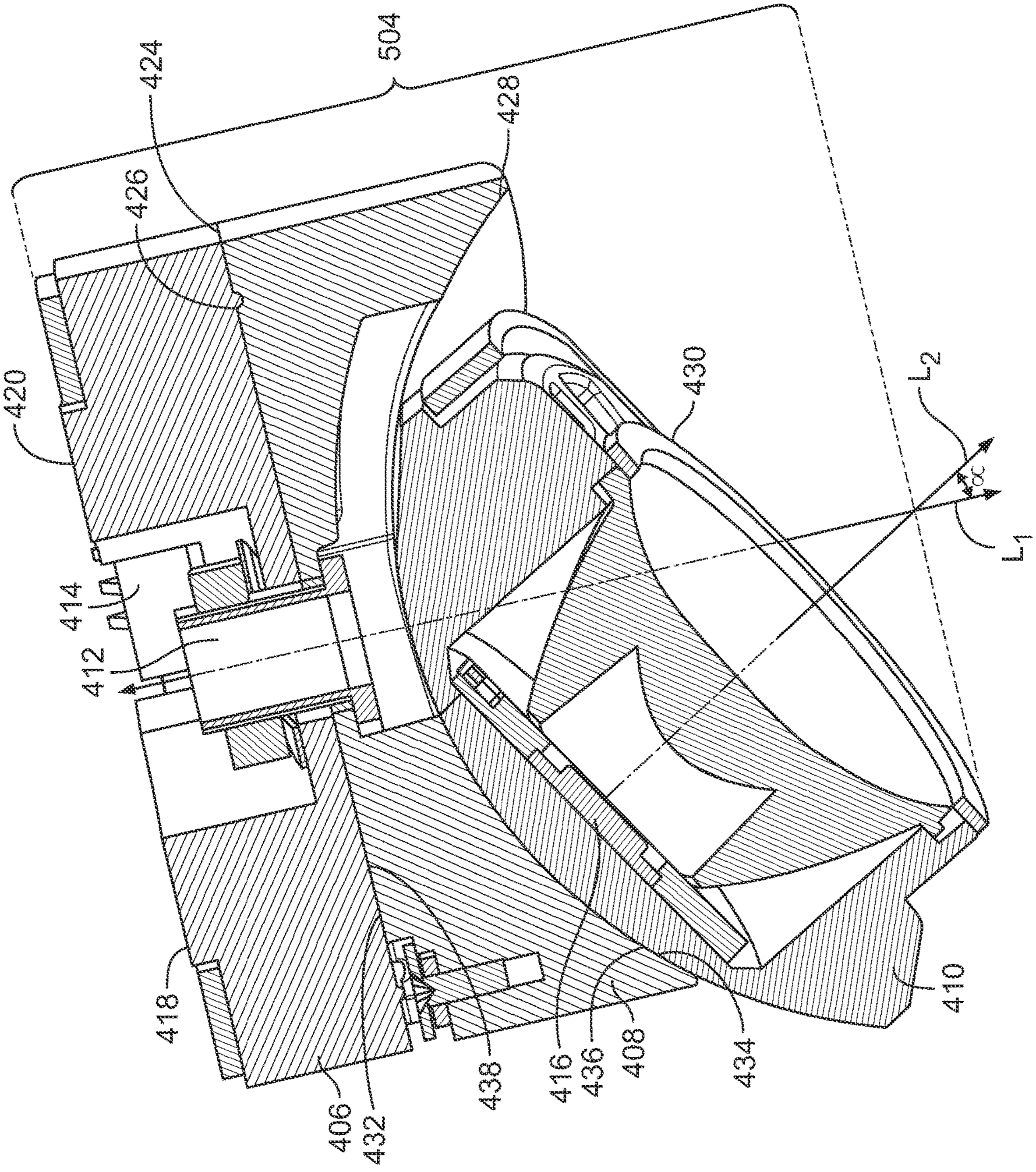
FIG. 6 shows schematically illustrative apparatus in accordance with the principles of the invention.

FIG. 6 shows light engine assembly 404 in which articulating body 410 is tilted at angle $\alpha$. Angle $\alpha$ may be a 30° angle. When articulating body 410 is tilted at angle $\alpha$, a percentage of top surface 434 may contact bottom surface 436. Illustrative percentages are listed in Table 6.

Figure 7:
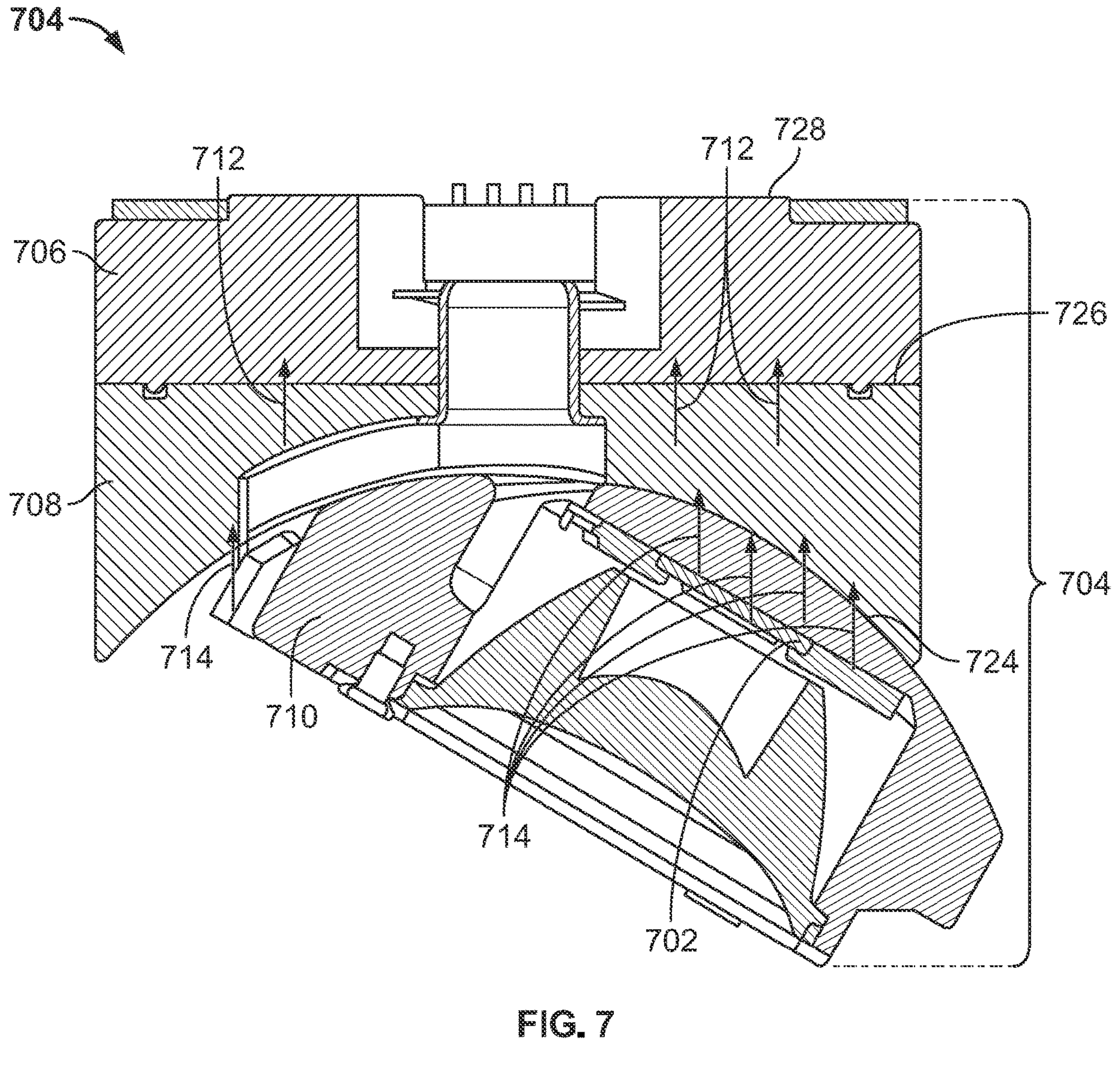
FIG. 7 shows schematically illustrative apparatus in accordance with the principles of the invention.

FIG. 7 shows a cross sectional view of light engine assembly 704. Light engine assembly 704 may include one or more features in common with one or more of light engine assembly 104 in fixture 100, light engine assembly 304 in fixture 300 and light engine assembly 404.

When light engine assembly 704 is connected to a housing, such as one or both of housing 102 and 302, LED light source 702 may receive power. When LED light source 702 is powered, LED light source 702 may generate heat. Heat may be transferred through articulating body 710. Arrows 714 may show heat transfer from articulating body 710 to rotatable body 708. Heat may be transferred through contact region 724 Arrows 712 may show heat transfer from rotatable body 708 to retention body 706. Heat may be transferred through contact region 726. The heat may be transferred from retention body 706 to the housing. The heat may be transferred through contact region 728. Throughout the heat transfer, heat may be absorbed by one or more of articulating body 710, rotatable body 708, retention body 804, the housing, or any other suitable parts included in the fixture. Throughout the heat transfer, heat may be conducted by one or more of articulating body 710, rotatable body 708, retention body 804, the housing, or any other suitable parts included in the fixture. The heat transfer may enable the heat to be dissipated through light engine assembly 704, in order maintain a surface temperature of the housing that is not greater than the predetermined maximum surface temperature. Illustrative predetermined maximum surface temperatures may be listed in Table 2.

Figure 8:
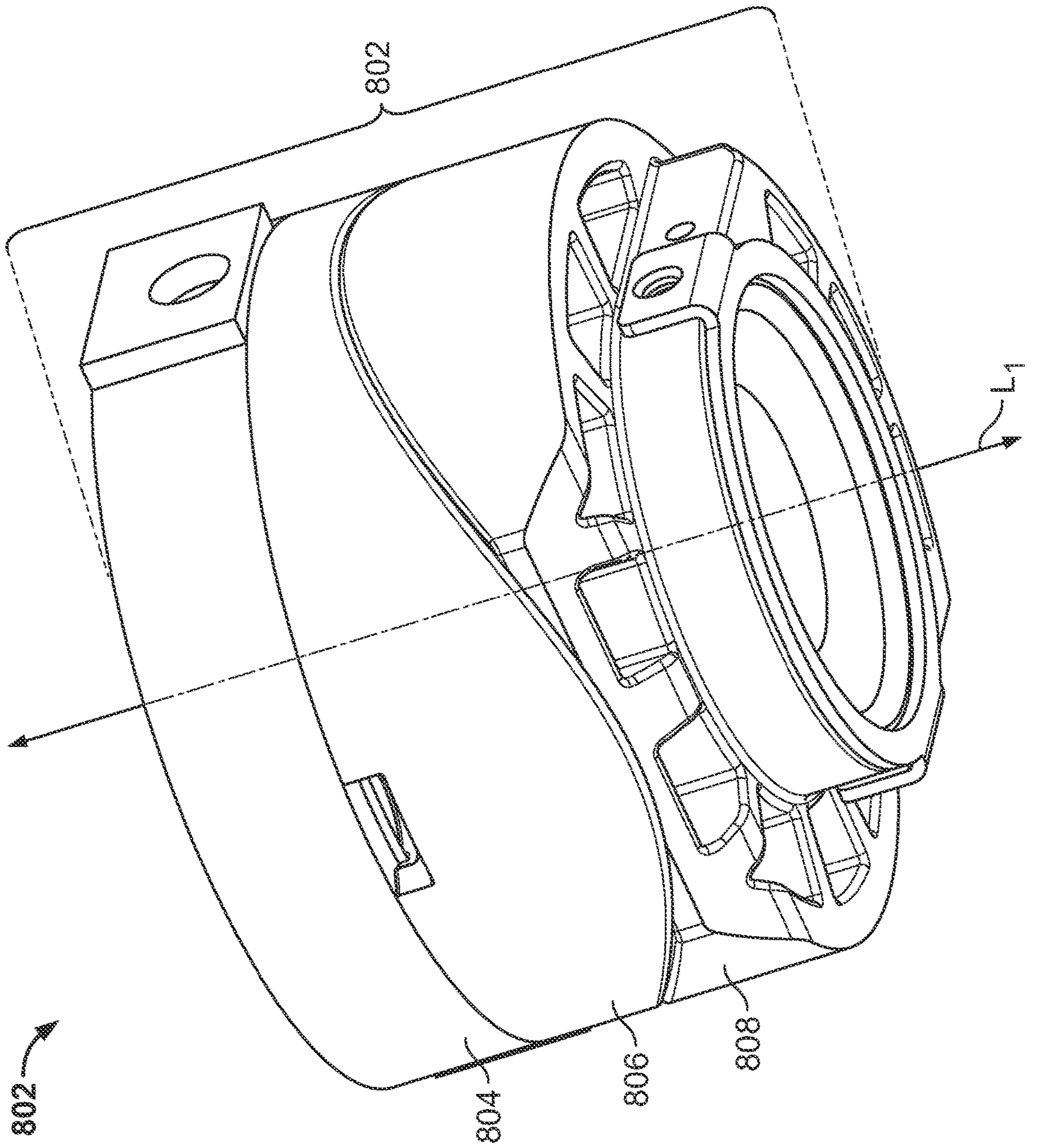
FIG. 8 shows schematically illustrative apparatus in accordance with the principles of the invention.

FIG. 8 shows a cross sectional view of light engine assembly 802. Light engine assembly 802 may include one or more features in common with one or more of light engine assembly 104, light engine assembly 304, light engine assembly 404, and light engine assembly 704.

Light engine assembly 802 may be in a non-tilted state. In a non-tilted state, articulating body 808 may not be tilted in relation to central axis $L_1$. When lighting engine assembly 802 is in a non-tilted state, retention body 804 and rotatable body 806 may not be tilted in relation to central axis $L_1$. When lighting engine assembly 802 is in a non-tilted state, 100% of a top surface of articulating body 808 may be in contact with a bottom surface of rotatable body 806.

Figure 9:
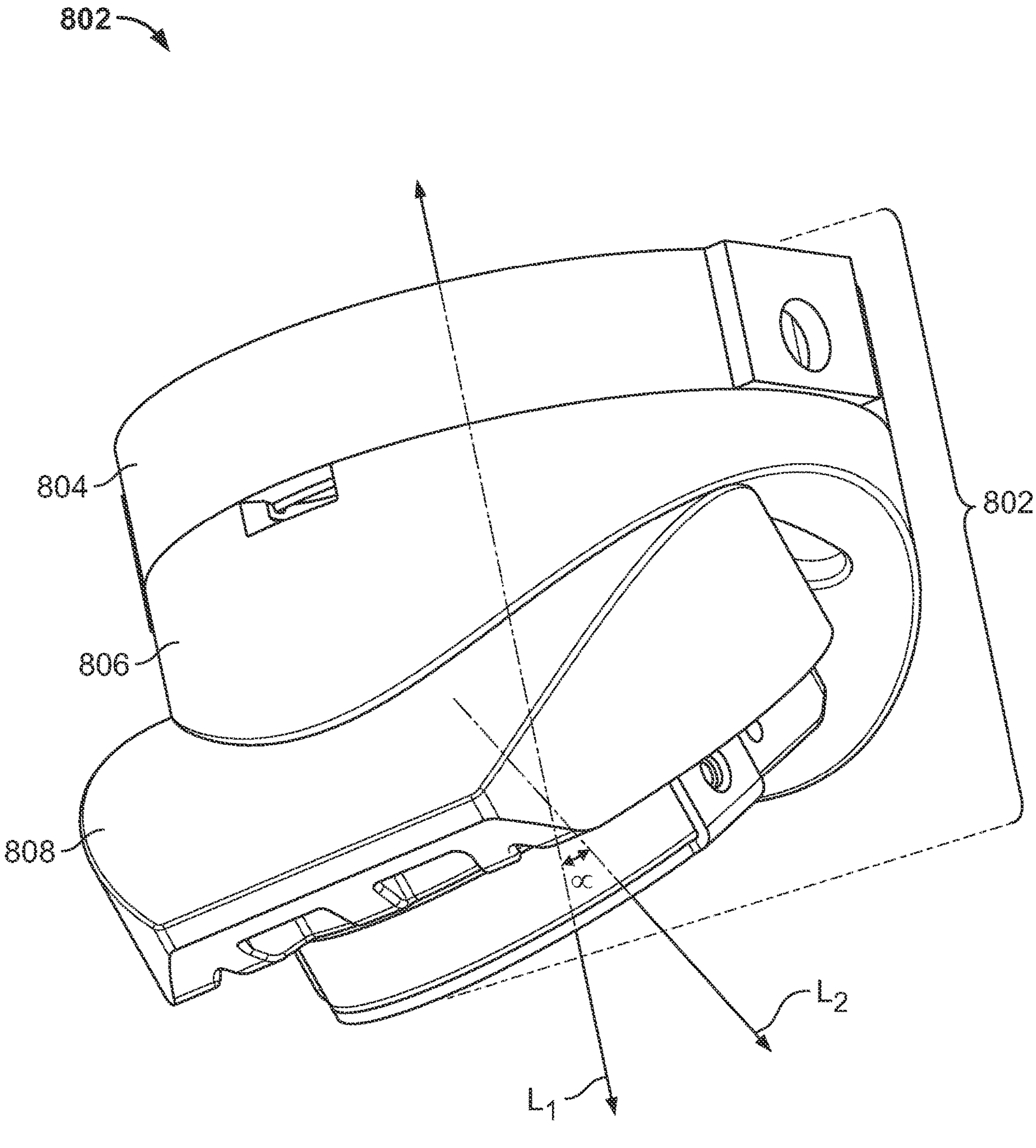
FIG. 9 shows schematically illustrative apparatus in accordance with the principles of the invention.

FIG. 9 shows light engine assembly 802 in a maximum-tilted state. In a maximum-tilted state, articulating body 808 may be tilted 30° in relation to central axis $L_1$, as shown by the intersection of axis $L_1$ and axis $L_2$. When lighting engine assembly 802 is in a maximum-tilted state, retention body 804 and rotatable body 806 may not be tilted in relation to central axis $L_1$. When lighting engine assembly 802 is in a maximum-tilted state, a percentage of a top surface of articulating body 808 may be in contact with a bottom surface of rotatable body 806. Illustrative percentages are listed in Table 6.

Figure 10:
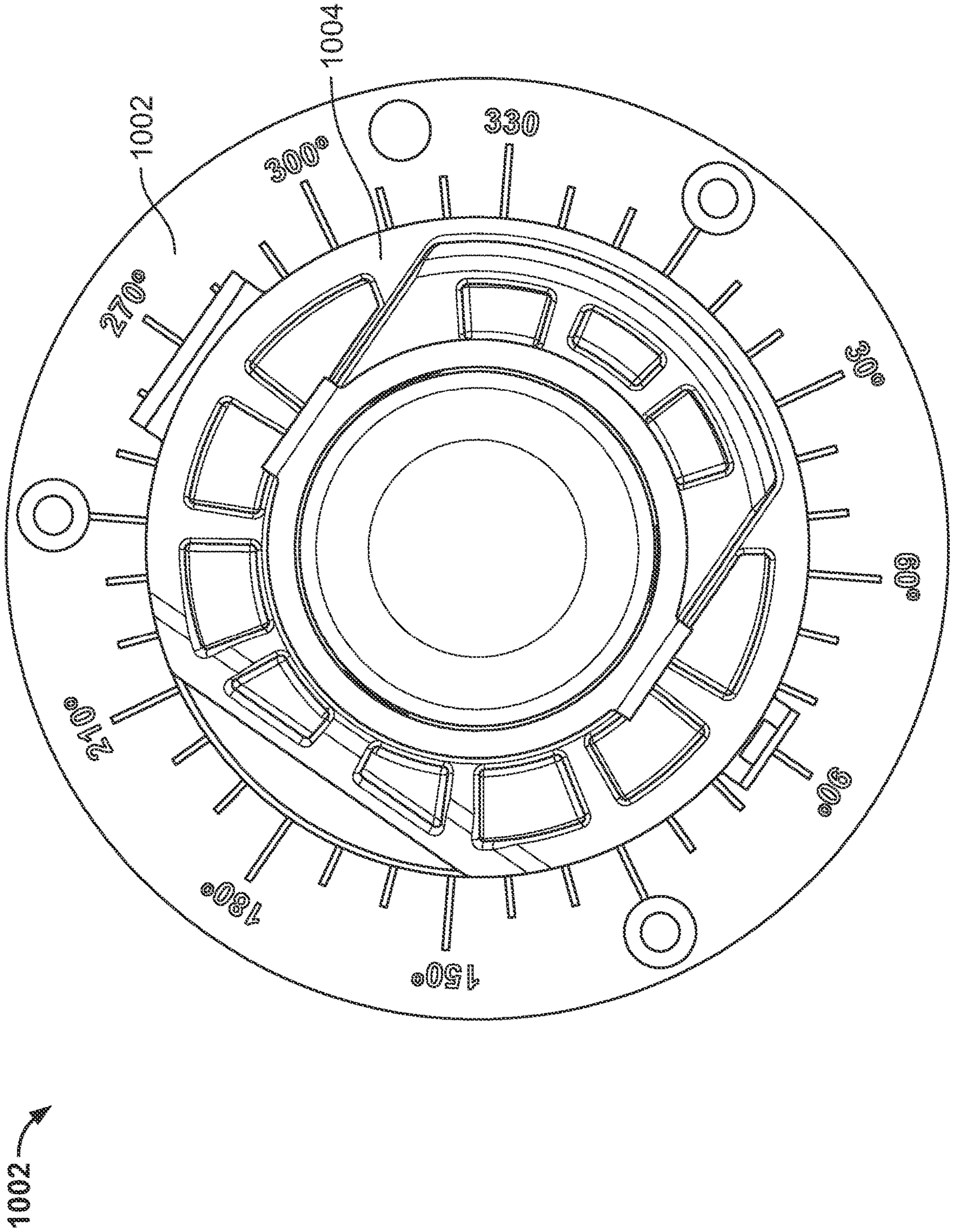
FIG. 10 shows schematically illustrative apparatus in accordance with the principles of the invention.

FIG. 10 shows a top view of light engine assembly 1004 when docked in a housing, such as housing 102 and 302. Light engine assembly 1004 may include one or more features in common with light engine assembly 104, light engine assembly 304, light engine assembly 404, light engine assembly 704, and light engine assembly 802.

The housing may include light engine receptacle ring 1002. Light engine receptacle ring 1002 may be configured to accept the insertion of light engine assembly 1004 into the housing. Light engine receptacle ring 1002 may include angle markings along an inner circumference. The angle markings may include markings from 0° to 360°. The angle markings may serve as a guide for rotation of lighting engine assembly 1004. Rotatable body (not shown) of light engine assembly 1004 may rotate light engine assembly 1004 in response to a rotation by a user. Light engine assembly 1004 may be rotatable up to the maximum angle of rotation. Illustrative maximum angles of rotation may be listed in Table 7.

Figure 11:
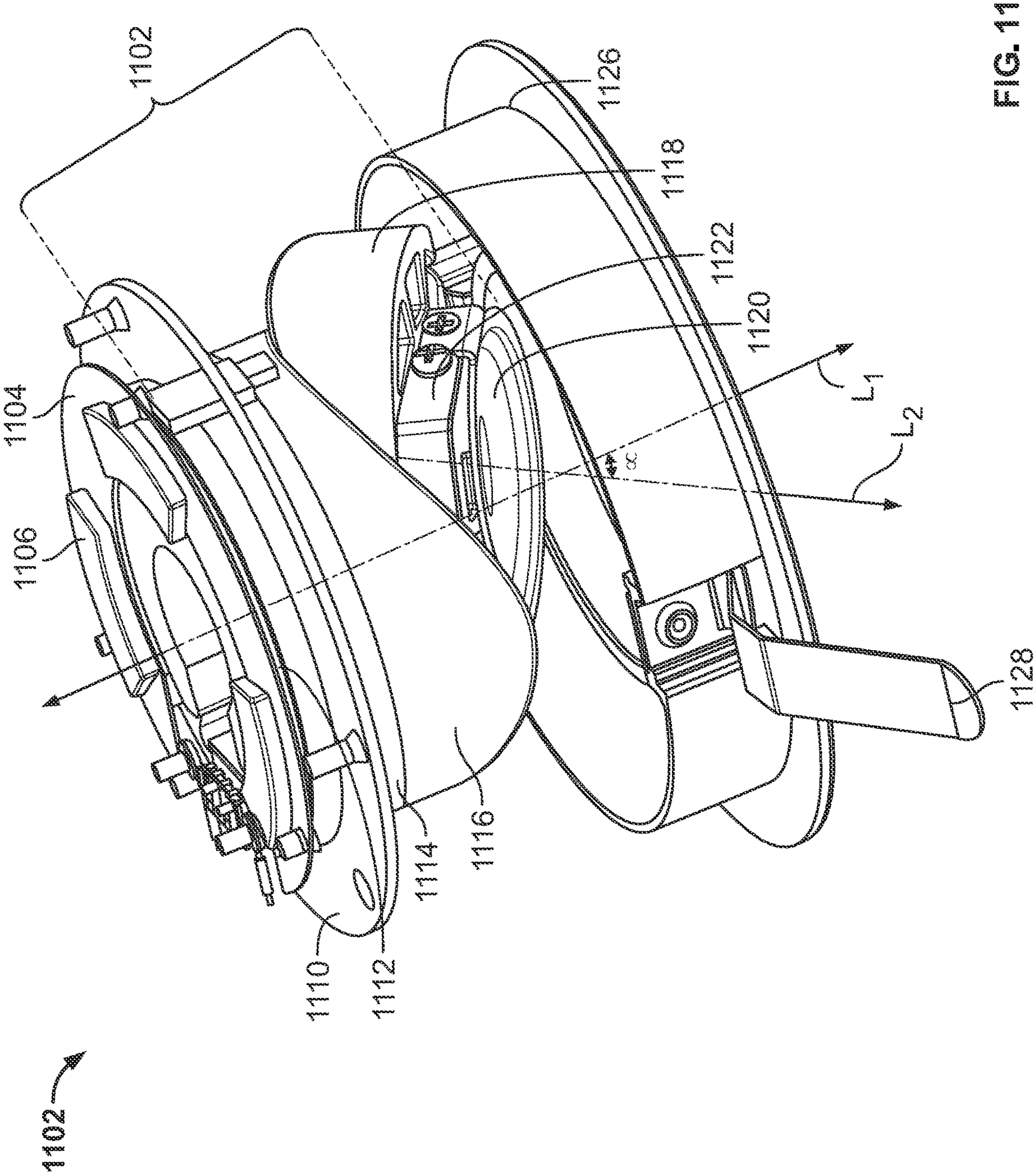
FIG. 11 shows schematically illustrative apparatus in accordance with the principles of the invention.

FIG. 11 shows light engine assembly 1102 docked in a housing such as housing 102 or 302. Light engine assembly 1102 may include one or more features in common with light engine assembly 104, light engine assembly 304, light engine assembly 404, light engine assembly 704, light engine assembly 802, and light engine assembly 1004.

When light engine assembly 1102 is docked to the housing, retention body 1114 may be magnetically connected to the housing via ring 1112 included in light engine assembly 1102 and housing coupler 1106 included in the housing. Housing coupler 1106 may be fixed to the housing by being disposed on housing coupler ring 1104. Housing coupler ring 1104 may include one or more housing couplers, such like housing coupler 1106. Light engine receptacle ring 1110 may be configured to accept light engine assembly 1102 when inserted into the housing.

Light engine assembly 1102 may be tilted by angle $\alpha$ in respect to axis $L_1$. Angle $\alpha$ may be a 30° angle. When light engine assembly 1102 is tilted by angle $\alpha$ in respect to axis $L_1$, rotatable body 1116 and retention body 1114 may not be tilted in relation to axis $L_1$.

The housing may include trim 1126. Trim 1126 may be a deep trim. Trim 1126 may have a depth that is great enough to mitigate a glare the can be created by reflector 1120, when articulating body 1118 is in a tilted-position. Trim 1126 may be inserted into the housing using anchor tab 1128. Trim 1126 may include one or more anchor tabs such like anchor tab 1128.

Light engine assembly 1102 may be rotatable. Light engine assembly 1102 may be rotatable even when articulating body 1118 is tilted. A user may rotate rotatable body 1116. A user may rotate rotatable body 1116 by rotating handle 1122 around axis $L_1$. The rotation of handle 1122 may rotate rotatable body 1116 and articulating body 1118. Retention body 1114 may remain fixed in response to a rotation of handle 1122 from the user. A user may rotate handle 1122 with trim 1126 attached to the housing. A user may rotate handle 1122 with trim 1126 not attached to the housing.

Figure 12:
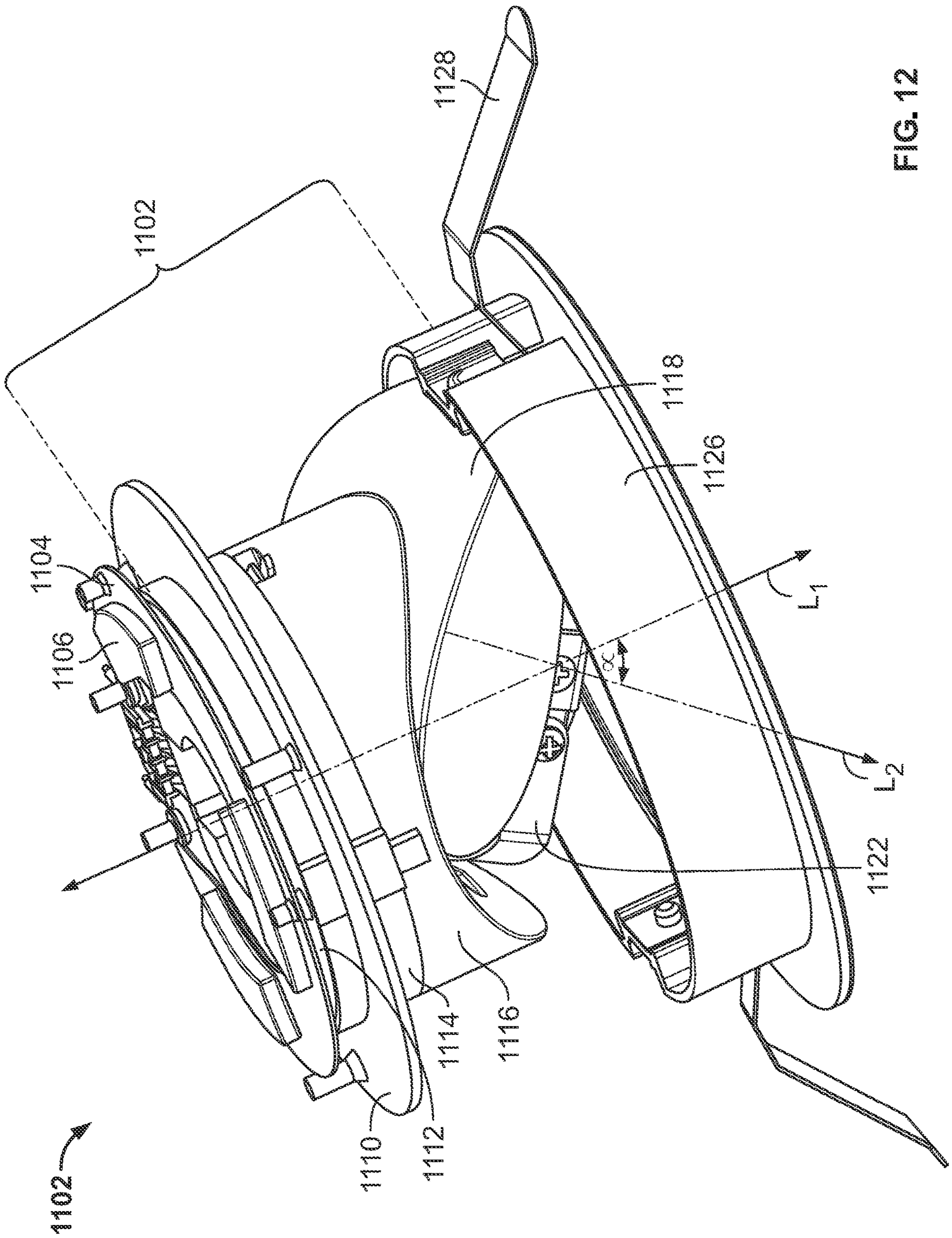
FIG. 12 shows schematically illustrative apparatus in accordance with the principles of the invention.

FIG. 12 is a back view of light engine assembly 1102.

Figure 13:
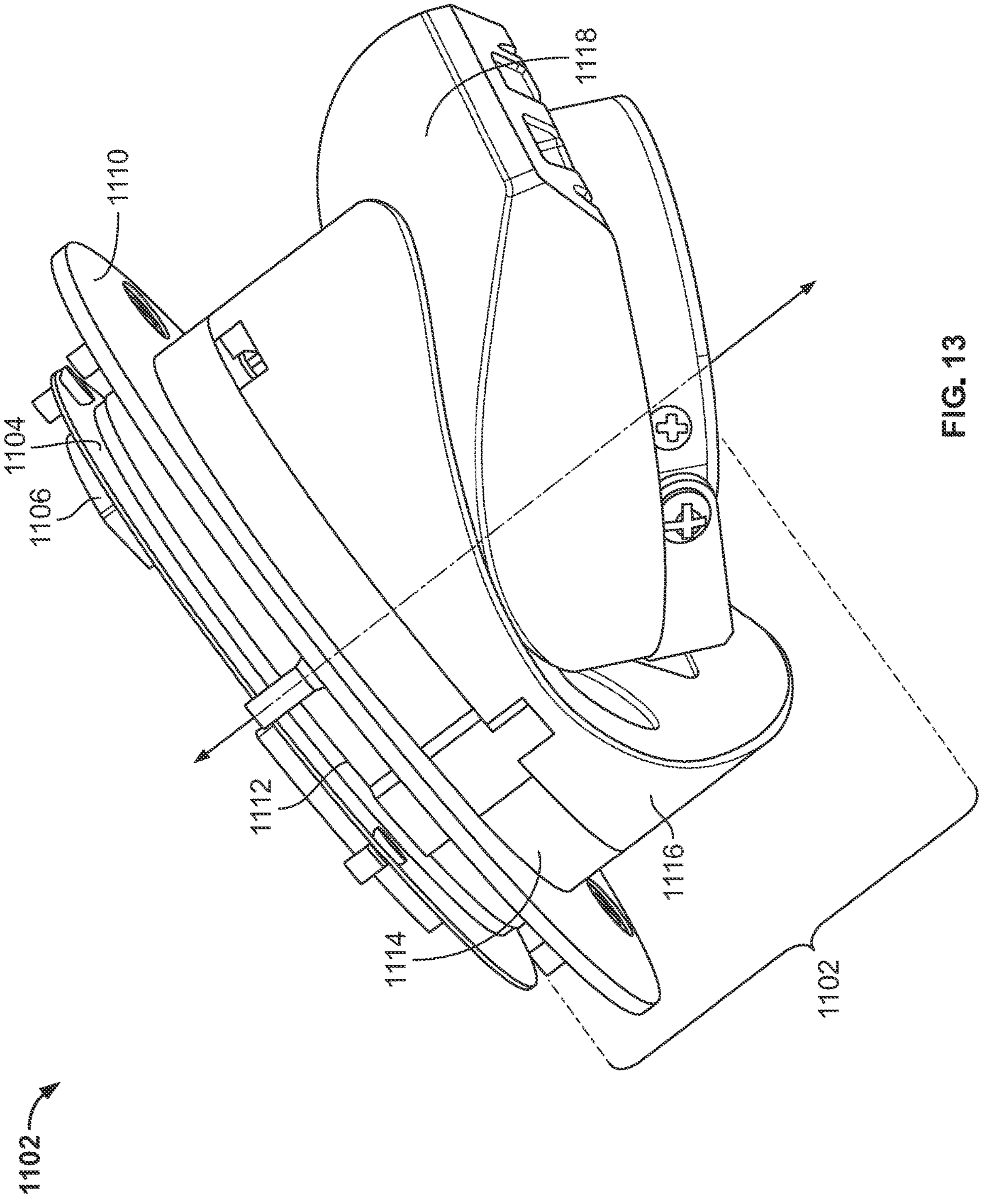
FIG. 13 shows schematically illustrative apparatus in accordance with the principles of the invention.

FIG. 13 is a close-up view of light engine assembly 1102 from the back.

Figure 14:
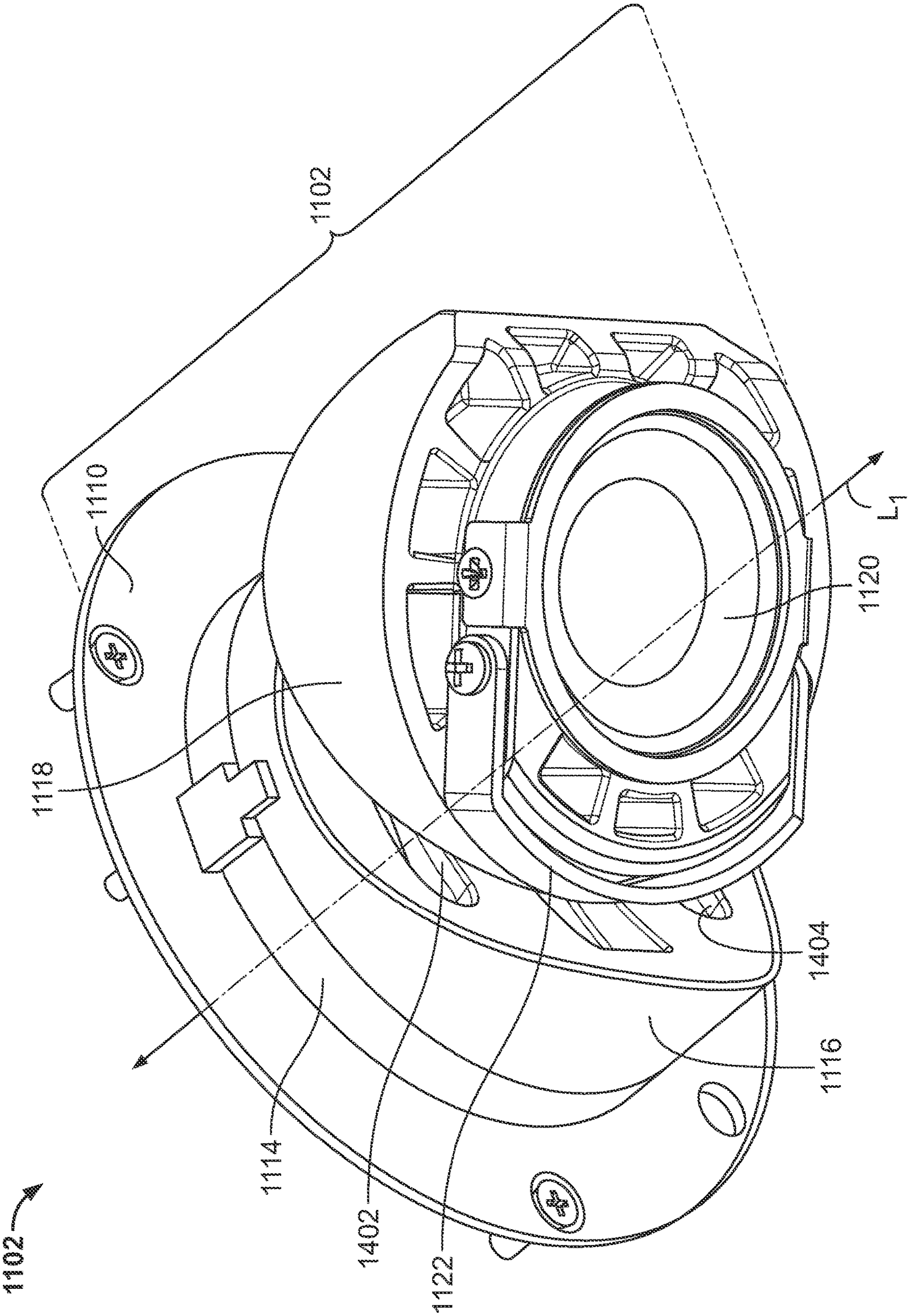
FIG. 14 shows schematically illustrative apparatus in accordance with the principles of the invention.

FIG. 14 shows light engine assembly 1102 from the bottom. Rotatable body 1116 may include keyways 1402 and 1404. Articulating body 1118 may include corresponding keys that may be configured to slide in keyways 1402 and 1404. Articulating body 1118 may tilt relative to axis $L_1$ in response to sliding the keys along keyways 1402 and 1404.

Figure 15:
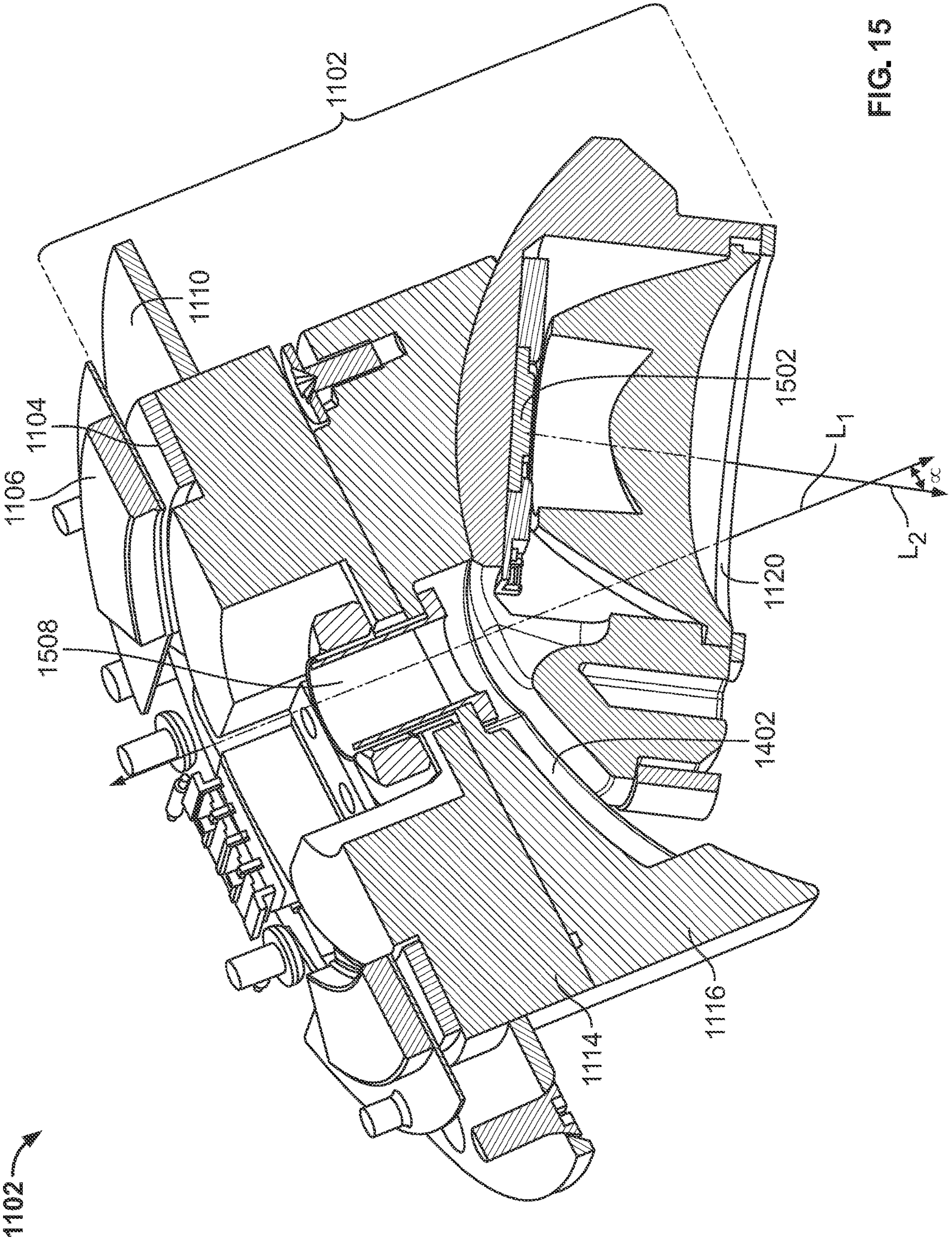
FIG. 15 shows schematically illustrative apparatus in accordance with the principles of the invention.

FIG. 15 shows a cross-sectional view of light engine assembly 1102. Articulating body 1118 may house LED light source 1502. LED light source 1502 may be powered from power leads disposed through power conduit 1508. Even when articulating body 1118 is tilted at a maximally-tilted angle, a portion of articulating body 1118 that LED light source 1502 is disposed in, may remain in contact with a bottom surface of rotatable body 1116.

Figure 16:
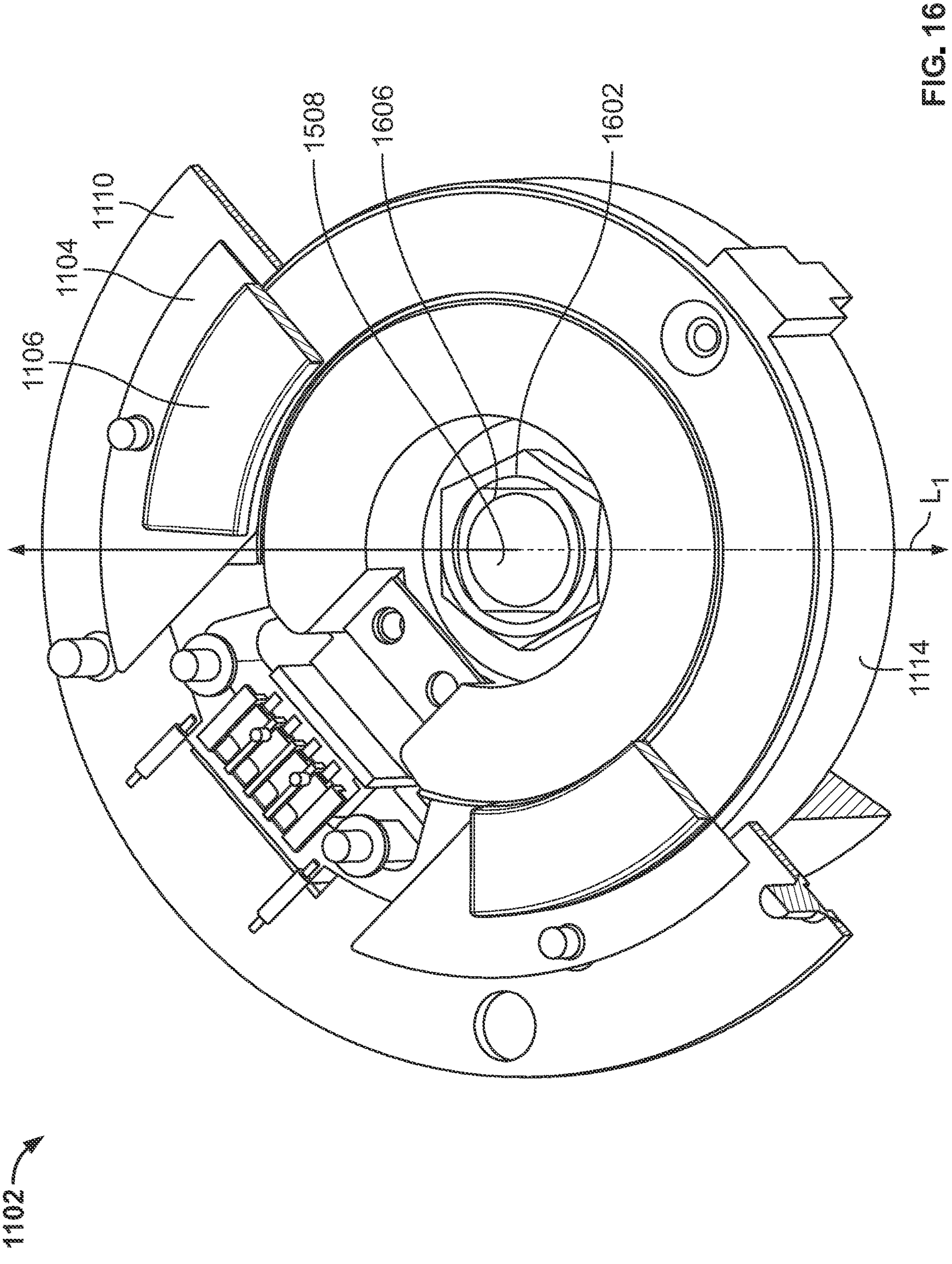
FIG. 16 shows schematically illustrative apparatus in accordance with the principles of the invention.

FIG. 16 shows a top view of light engine assembly 1102. Retention body 1114 may be attached to rotatable body 1116 using nut 1602. Power conduit 1508 may include a threaded rod 1606. Nut 1602 may screw onto threaded rod 1606. Threaded rod 1606 may be placed through power conduit 1508.

Figure 17:
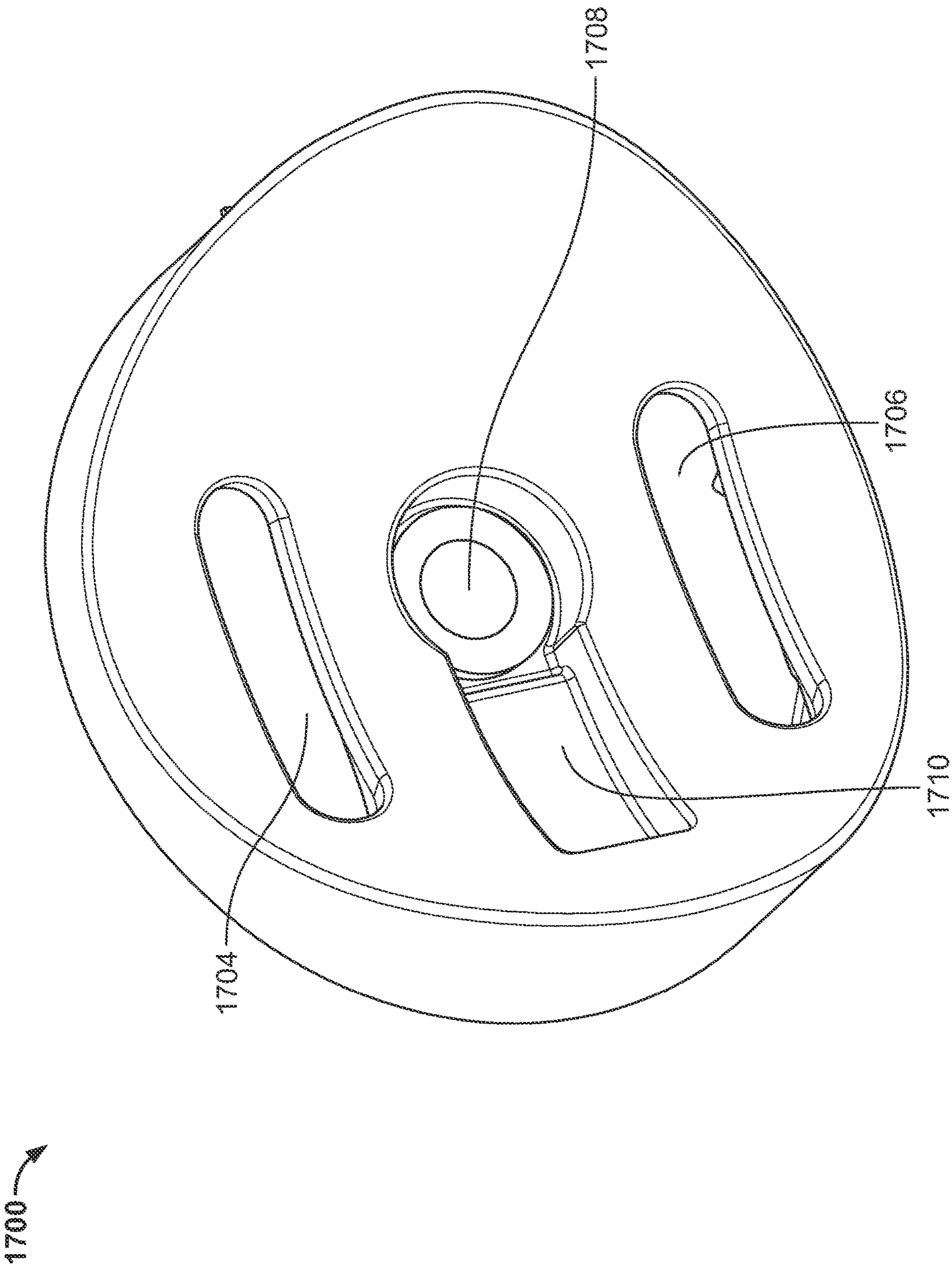
FIG. 17 shows schematically illustrative apparatus in accordance with the principles of the invention.

FIG. 17 shows illustrative rotatable body 1700. Rotatable body 1700 may include one or more features in common with light engine assembly 104, light engine assembly 304, light engine assembly 404, light engine assembly 704, light engine assembly 802, light engine assembly 1004, and light engine assembly 1102, as relating to the rotatable body.

Rotatable body 1700 may include center cutout 1708. Center cutout 1708 may define a power conduit. A threaded rod to be threaded through center cutout 1708. Rotatable body may rotate about the threaded rod. Rotatable body 1700 may include divot 1710 adjacent center cutout 1708. Rotatable body 1700 may include keyway 1704 and keyway 1706.

Figure 18:
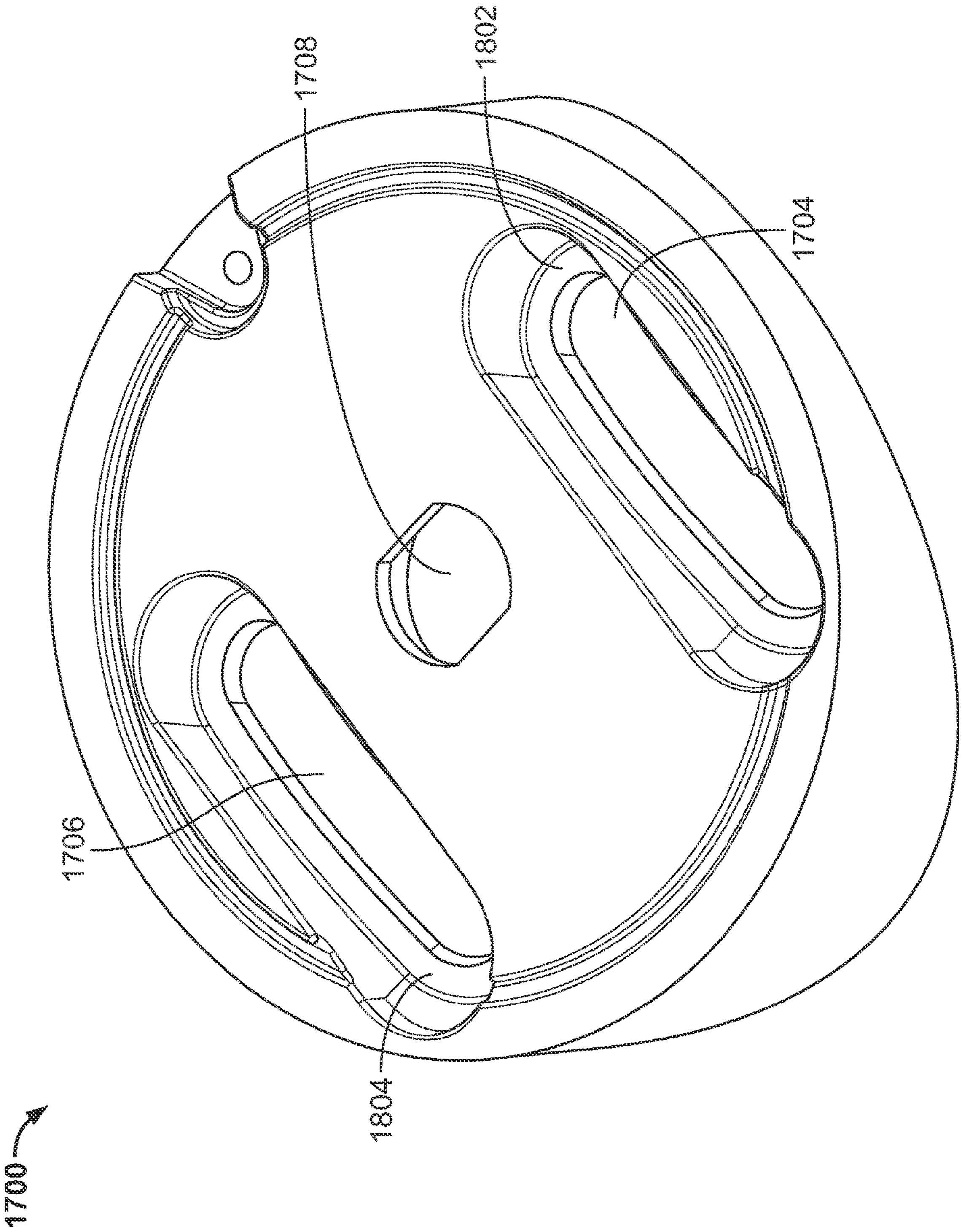
FIG. 18 shows schematically illustrative apparatus in accordance with the principles of the invention.

FIG. 18 shows a top view of rotatable body 1700. Keyway 1706 may include ledge 1804. Keyway 1704 may include ledge 1802. Ledges 1804 and 1802 may be configured to enable keys to slide along keyways 1704 and 1706.

Figure 19:
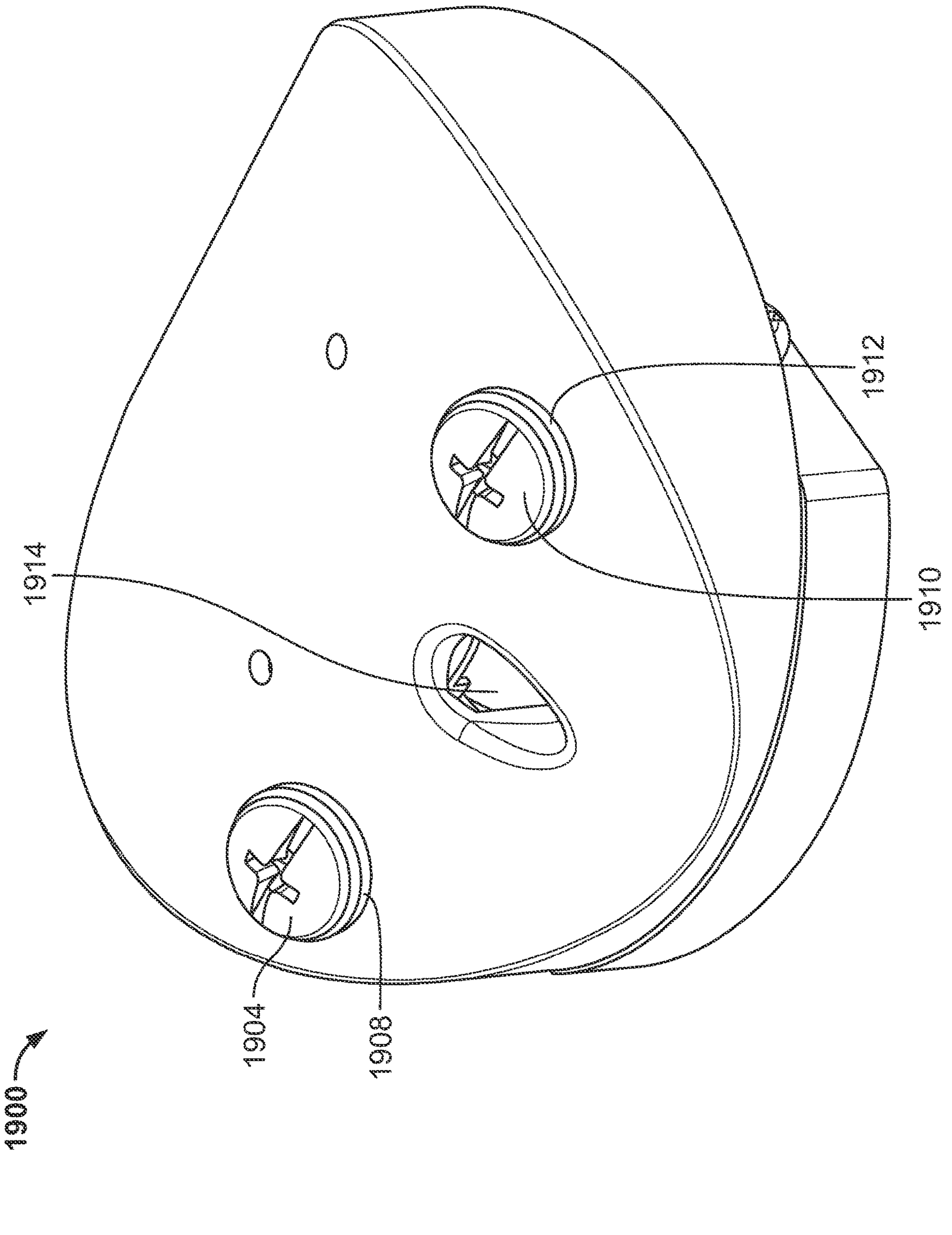
FIG. 19 schematically illustrative apparatus in accordance with the principles of the invention.

FIG. 19 shows illustrative articulating body 1900. Articulating body 1900 may include one or more features in common with light engine assembly 104, light engine assembly 304, light engine assembly 404, light engine assembly 704, light engine assembly 802, light engine assembly 1004, and light engine assembly 1102, as relating to the articulating body.

Articulating body 1900 may include cutout 1914. Cutout 1914 may enable power leads from a power conduit connect to an LED light source disposed in articulating body 1900. Articulating body may include key 1904. Key 1904 may include bearing 1908. Articulating body 1900 may include key 1910. Key 1910 may include bearing 1912. Bearings 1908 and 1912 may enable keys 1904 and 1910 to slide along a keyway, such as keyways 1704 and 1706 as described in FIGS. 17 and 18.

Figure 20:
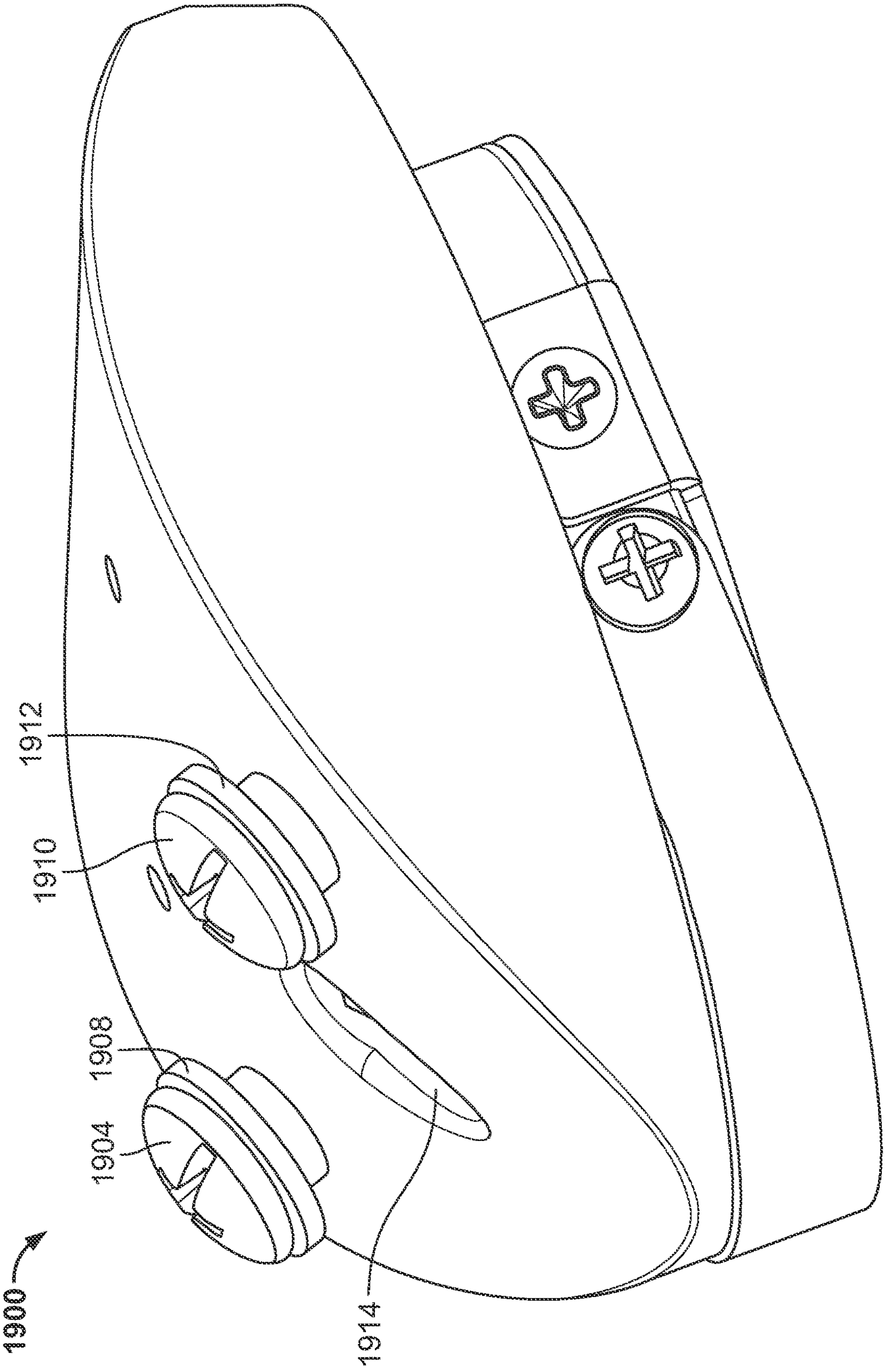
FIG. 20 schematically illustrative apparatus in accordance with the principles of the invention.

FIG. 20 shows a side view of articulating body 1900.

Figure 21:
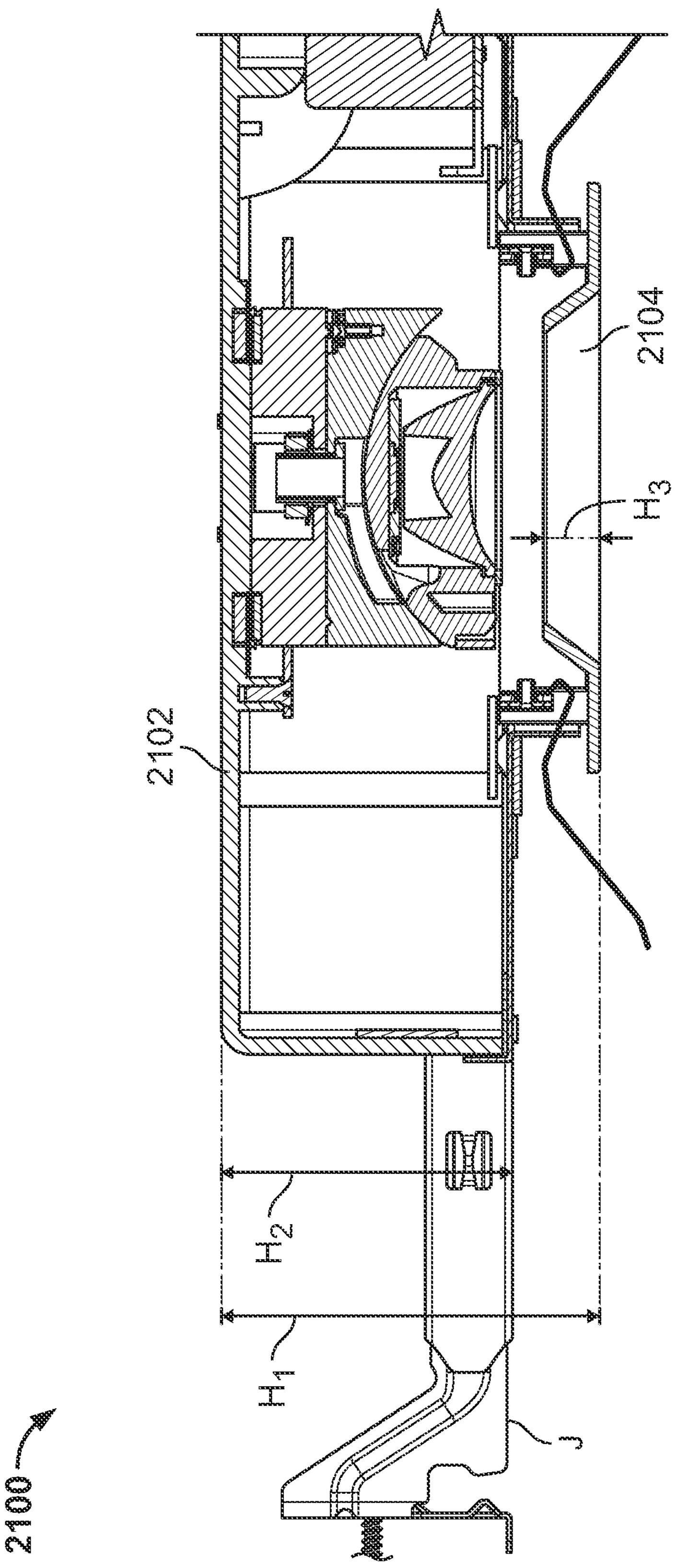
FIG. 21 schematically illustrative apparatus in accordance with the principles of the invention.

FIG. 21 shows illustrative fixture 2100. Fixture 2100 may have one or more features in common with one or more of fixtures 100 and 300.

A height of housing 2102 may be illustrated by $H_1$. The height of housing 2102 including trim 2104 may be any of the heights as included in Table 13. A height of housing 2102 without including trim 2104 may be illustrated by $H_2$. The height of housing 2102 without trim 2104 may be any of the heights as included in Table 14. A height of the trim may be illustrated by $H_3$. The height of the trim may be any of the heights included in Table 15.

Figure 22:
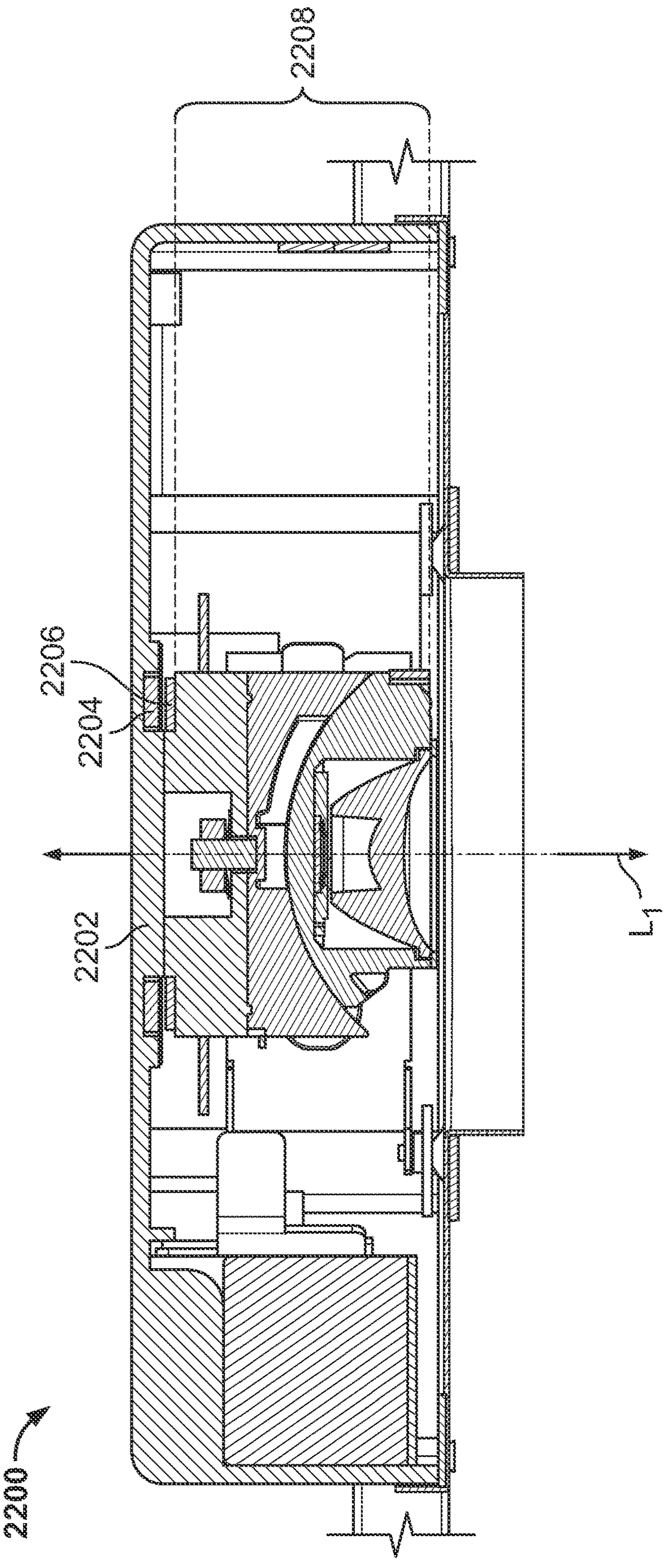
FIG. 22 shows schematically illustrative apparatus in accordance with the principles of the invention.

FIG. 22 shows illustrative fixture 2200. Fixture 2500 may have one or more features in common with one or more of fixtures 100, 300, and 2100.

Fixture 2200 may include trim 2210. Housing 2202 may define an aperture. The diameter of the aperture may be larger than the diameter of light engine assembly 2208. Light engine assembly 2208 may be removeable through the aperture defined by housing 2202.

Light engine assembly 2208 may be magnetically docked to housing 2202 via housing coupler 2204 and ring 2206. In response to a linear force along axis $L_1$ by a user, light engine assembly 2208 may be removed from housing 2202.

Figure 23:
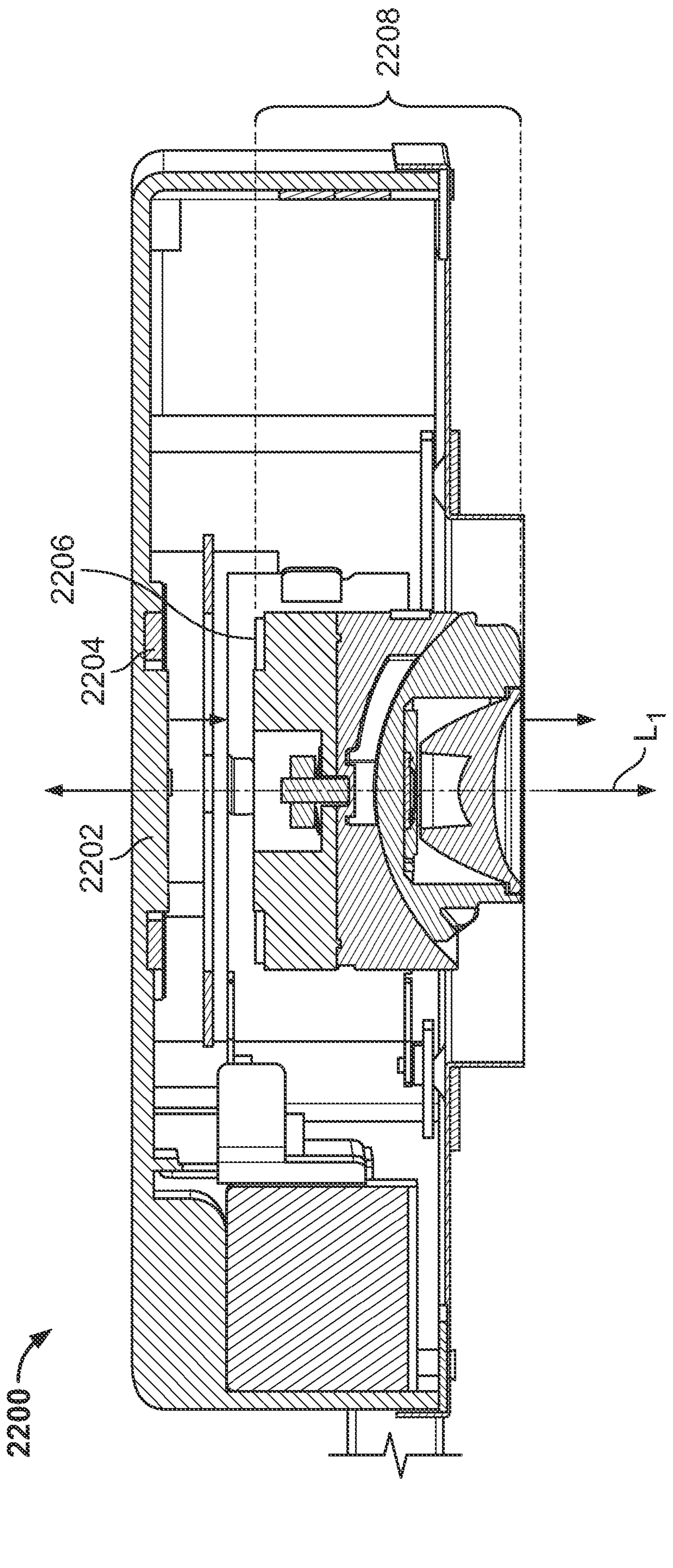
FIG. 23 shows schematically illustrative apparatus in accordance with the principles of the invention.

FIG. 23 shows light engine assembly 2208 as it is being removed from housing 2202.

Figure 24:
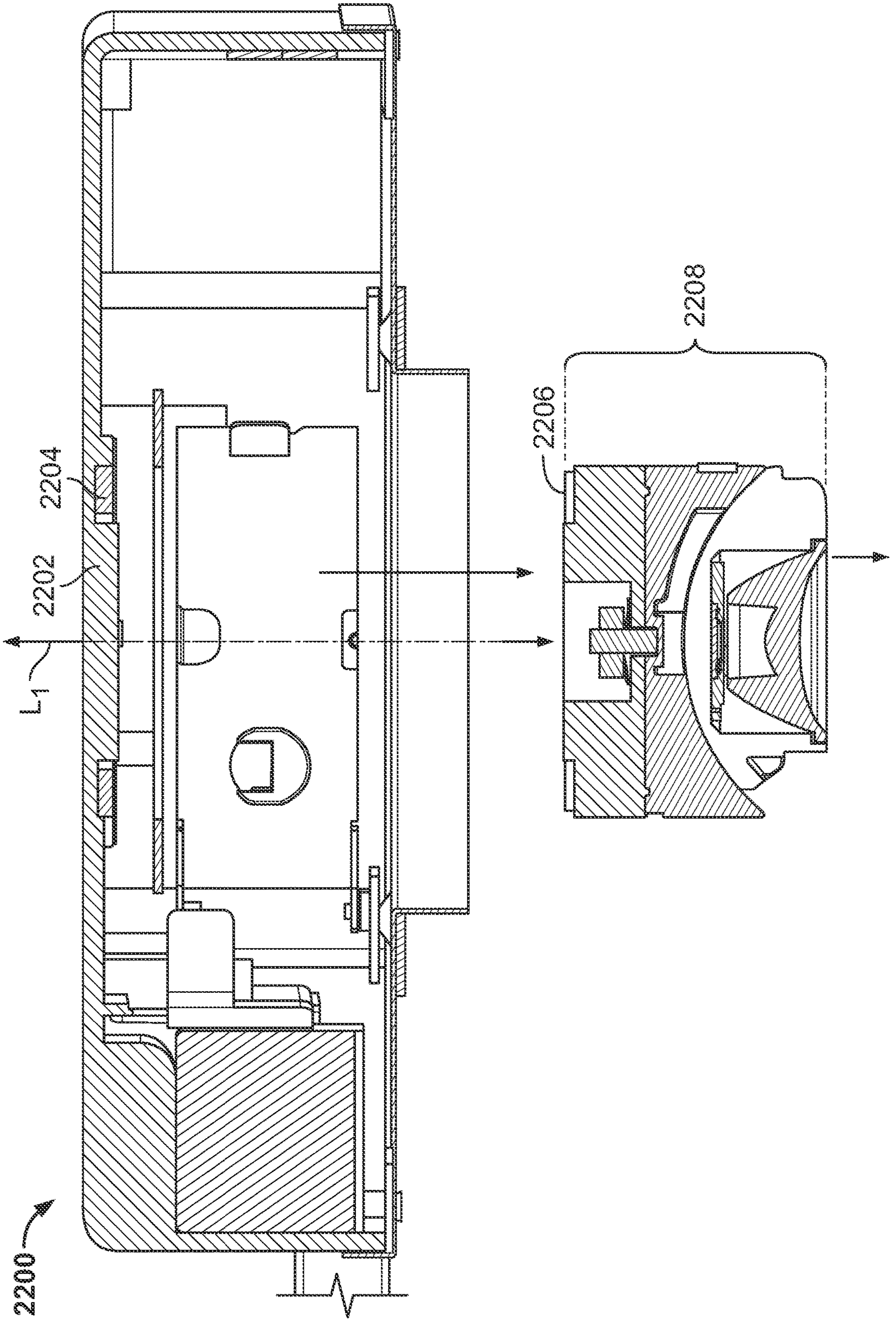
FIG. 24 shows schematically illustrative apparatus in accordance with the principles of the invention.

FIG. 24 shows light engine assembly 2208 after it has been removed from housing 2202 through the aperture defined by housing 2202.

Figure 25:
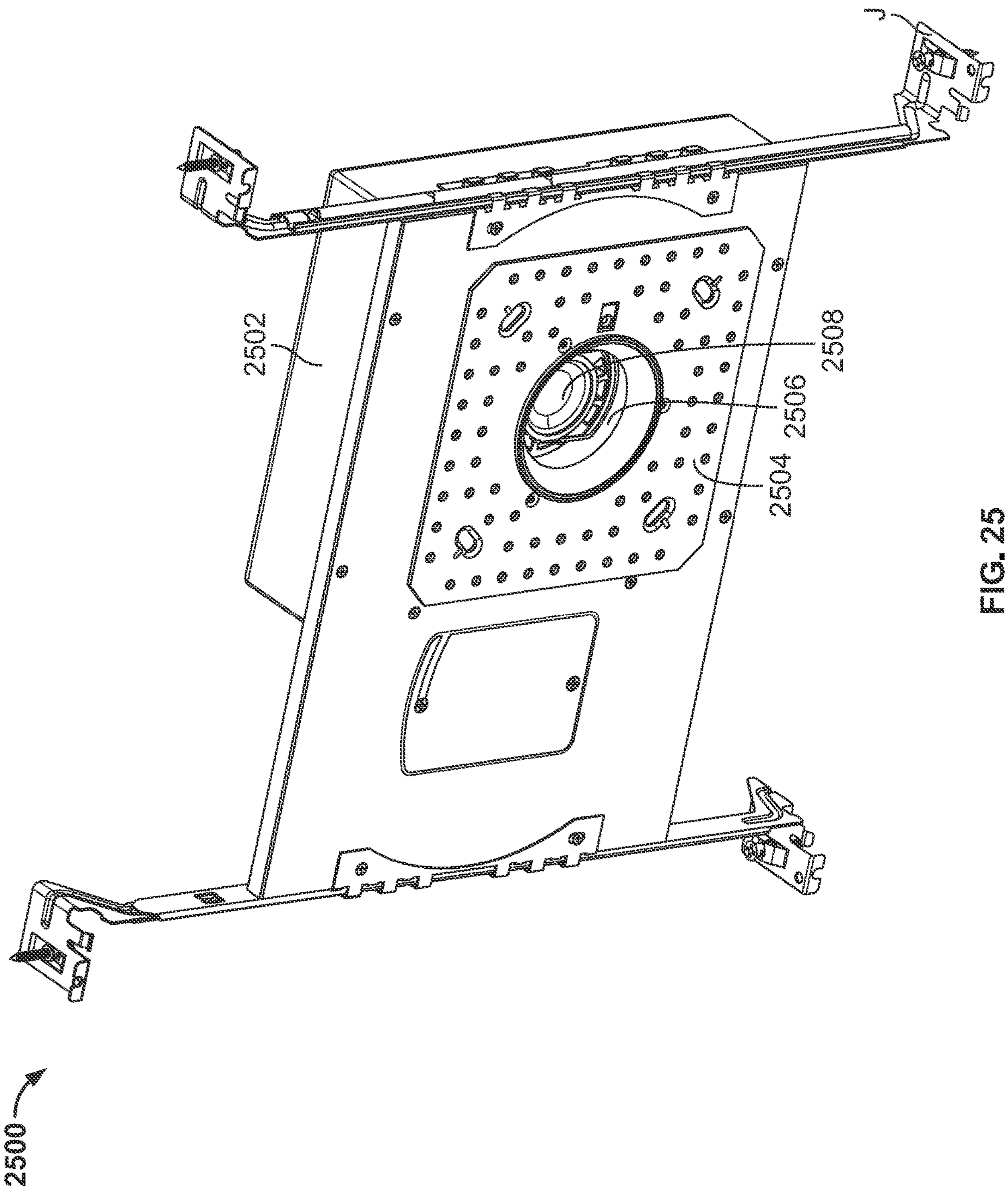
FIG. 25 shows schematically illustrative apparatus in accordance with the principles of the invention.

FIG. 25 shows illustrative fixture 2500. Fixture 2500 may have one or more features in common with one or more of fixtures 100, 300, 2100 and 2200.

Fixture 2500 may include housing 2502. The architectural structure may include joists J. Fixture 2500 may be mounted to joists J. Fixture 2500 may include trim 2506. Trim 2506 may be a circular rimless trim. Trim 2506 may be attached to spackle plate 2504. Trim 2506 may be tapered trim. Trim 2506 may define an aperture. The aperture may be tapered aperture. The aperture may enable an LED light source included in light engine assembly 2508 to propagate light emitted by an LED light source.

Figure 26:
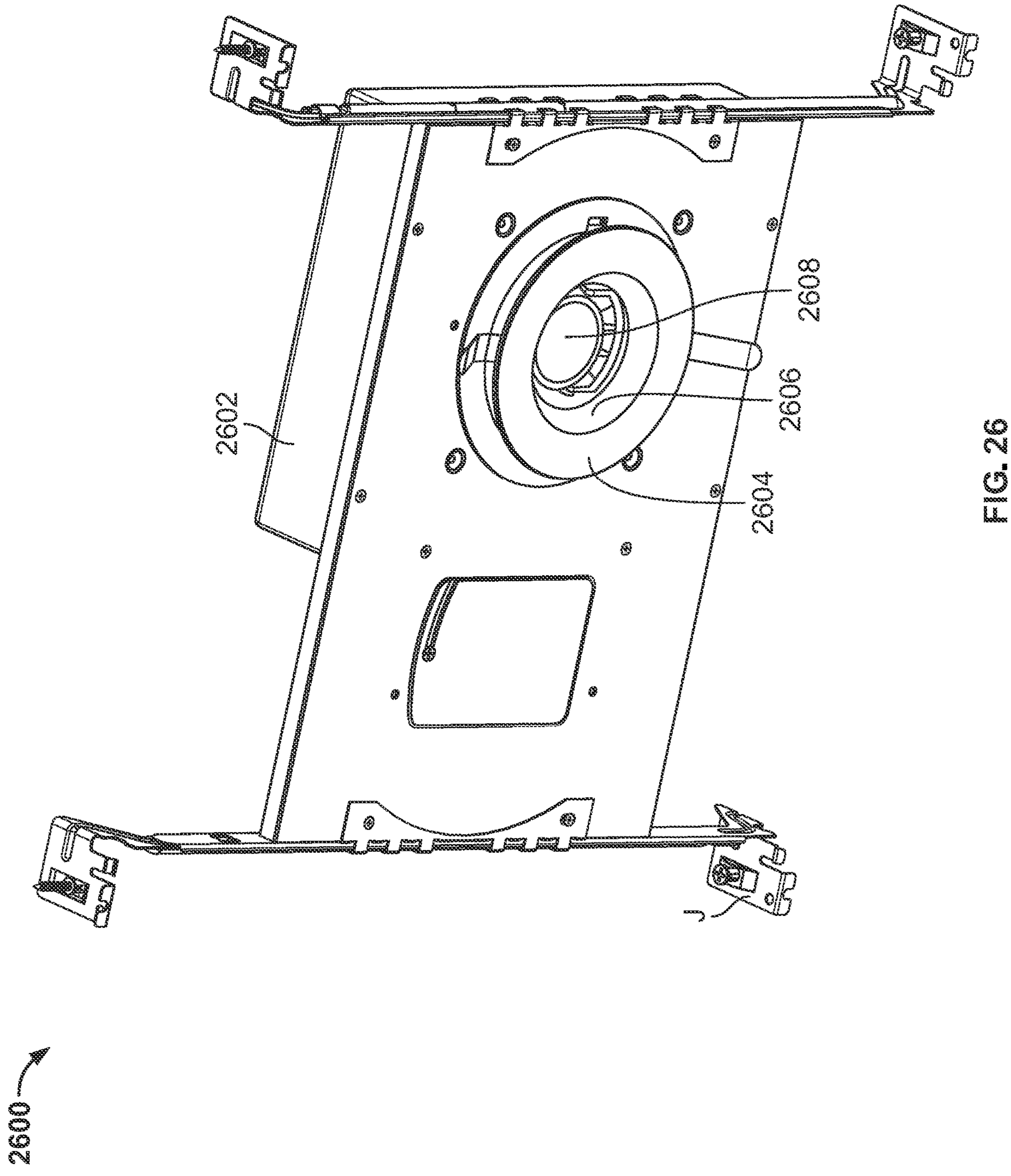
FIG. 26 shows schematically illustrative apparatus in accordance with the principles of the invention.

FIG. 26 shows illustrative fixtures 2600. Fixture 2600 may have one or more features in common with one or more of fixtures 100, 300, 2100 and 2200.

Fixture 2600 may include housing 2602. The architectural structure may include joists J. Fixture 2600 may be mounted to joists J. Fixture 2600 may include trim 2606. Trim 2606 may include circular rim 2604. Trim 2606 may be tapered. Trim 2606 may define an aperture. The aperture may be a tapered trim. The aperture may enable an LED light source included in light engine assembly 2608 to propagate light emitted by an LED light source.

Figure 27:
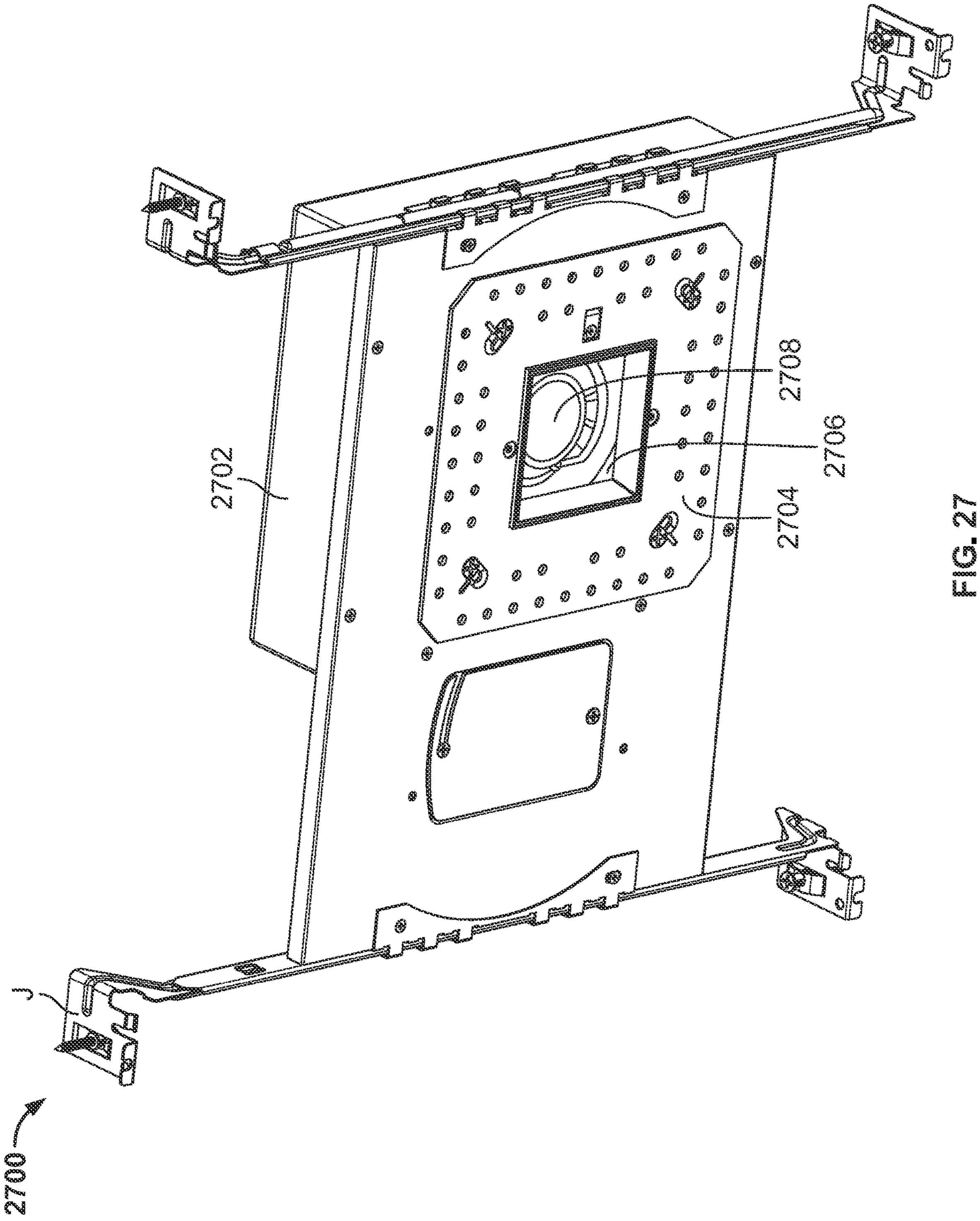
FIG. 27 shows schematically illustrative apparatus in accordance with the principles of the invention.

FIG. 27 shows illustrative fixtures 2700. Fixture 2700 may have one or more features in common with one or more of fixtures 100, 300, 2100 and 2200.

Fixture 2700 may include housing 2702. The architectural structure may include joists J. Fixture 2700 may be mounted to joists J. Fixture 2700 may include trim 2706. Trim 2706 may be a quadrilateral-shaped rimless trim. Trim 2706 may be a tapered trim. Trim 2706 may be attached to spackle plate 2704. Trim 2706 may define an aperture. The aperture may be a tapered aperture. The aperture may enable an LED light source included in light engine assembly 2708 to propagate light emitted by an LED light source.

Figure 28:
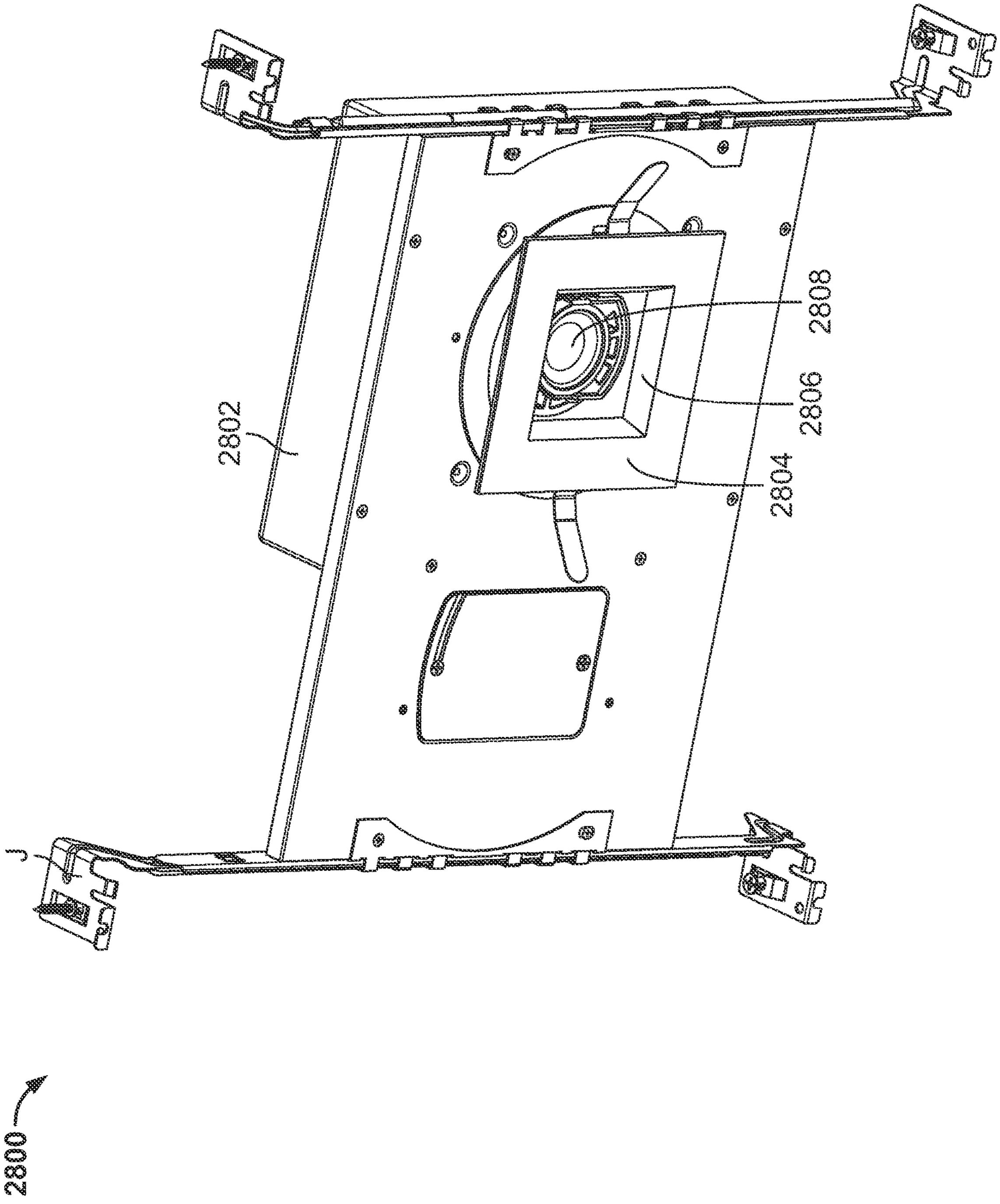
FIG. 28 shows schematically illustrative apparatus in accordance with the principles of the invention.

FIG. 28 shows illustrative fixtures 2800. Fixture 2800 may have one or more features in common with one or more of fixtures 100, 300, 2100 and 2200.

Fixture 2800 may include housing 2802. The architectural structure may include joists J. Fixture 2800 may be mounted to joists J. Fixture 2800 may include trim 2806. Trim 2806 may have quadrilateral-shaped rim 2804. Trim 2806 may be a tapered trim. Trim 2806 may define an aperture. The aperture may be tapered. The aperture may enable an LED light source included in light engine assembly 2808 to propagate light emitted by an LED light source.

Figure 29:
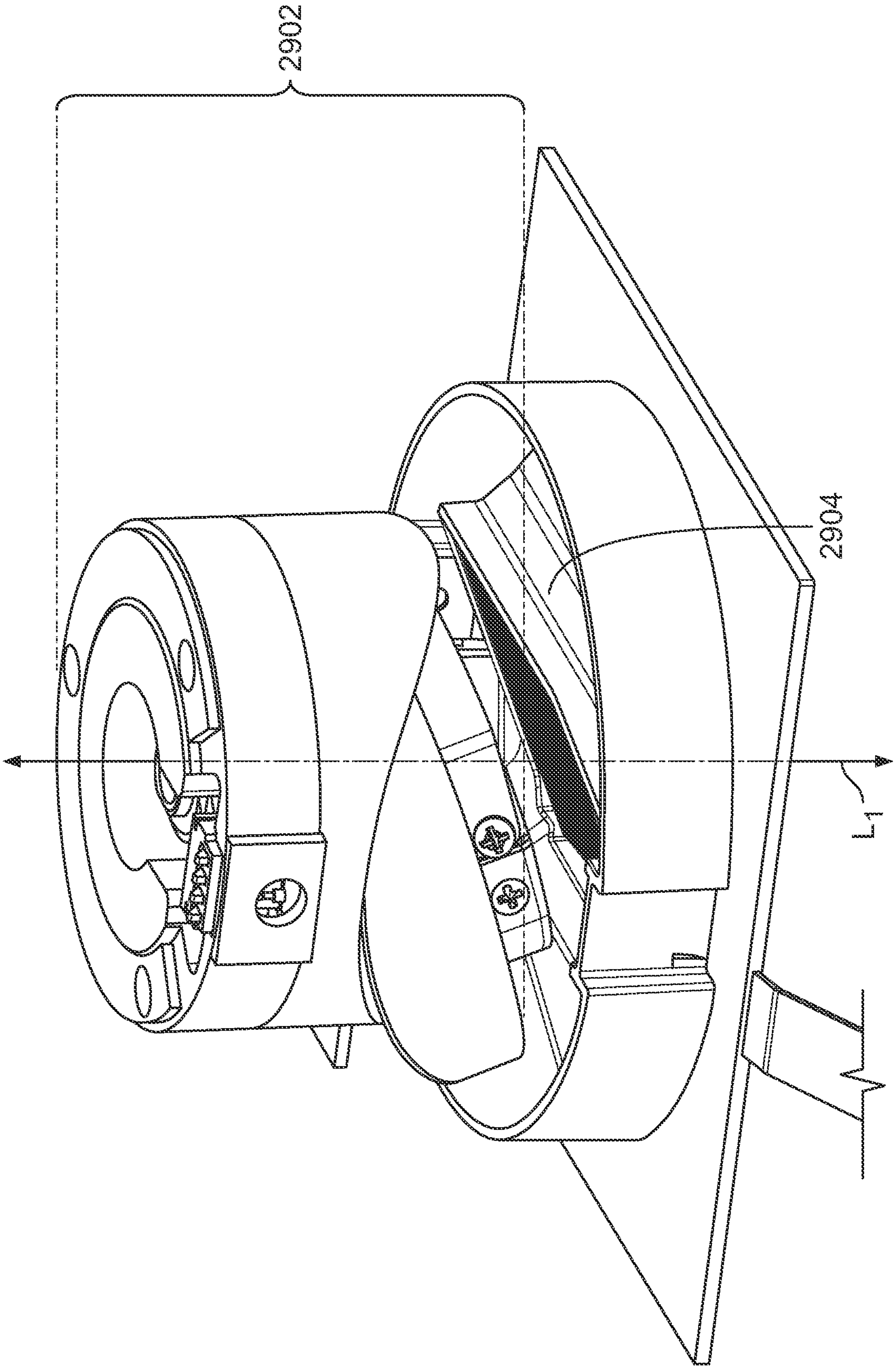
FIG. 29 shows schematically illustrative apparatus in accordance with the principles of the invention.

FIG. 29 shows light engine assembly 2902 with wall wash trim 2904. Light engine assembly 2902 may include one or more features in common with one or more of light engine assembly 104, light engine assembly 304, light engine assembly 404, light engine assembly 704, light engine assembly 802, light engine assembly 1004, light engine assembly 1102 and light engine assembly 2208.

Wall wash trim 2904 may be configured to direct light propagated from light engine assembly 2902 to illuminate a desired surface.

Figure 30:
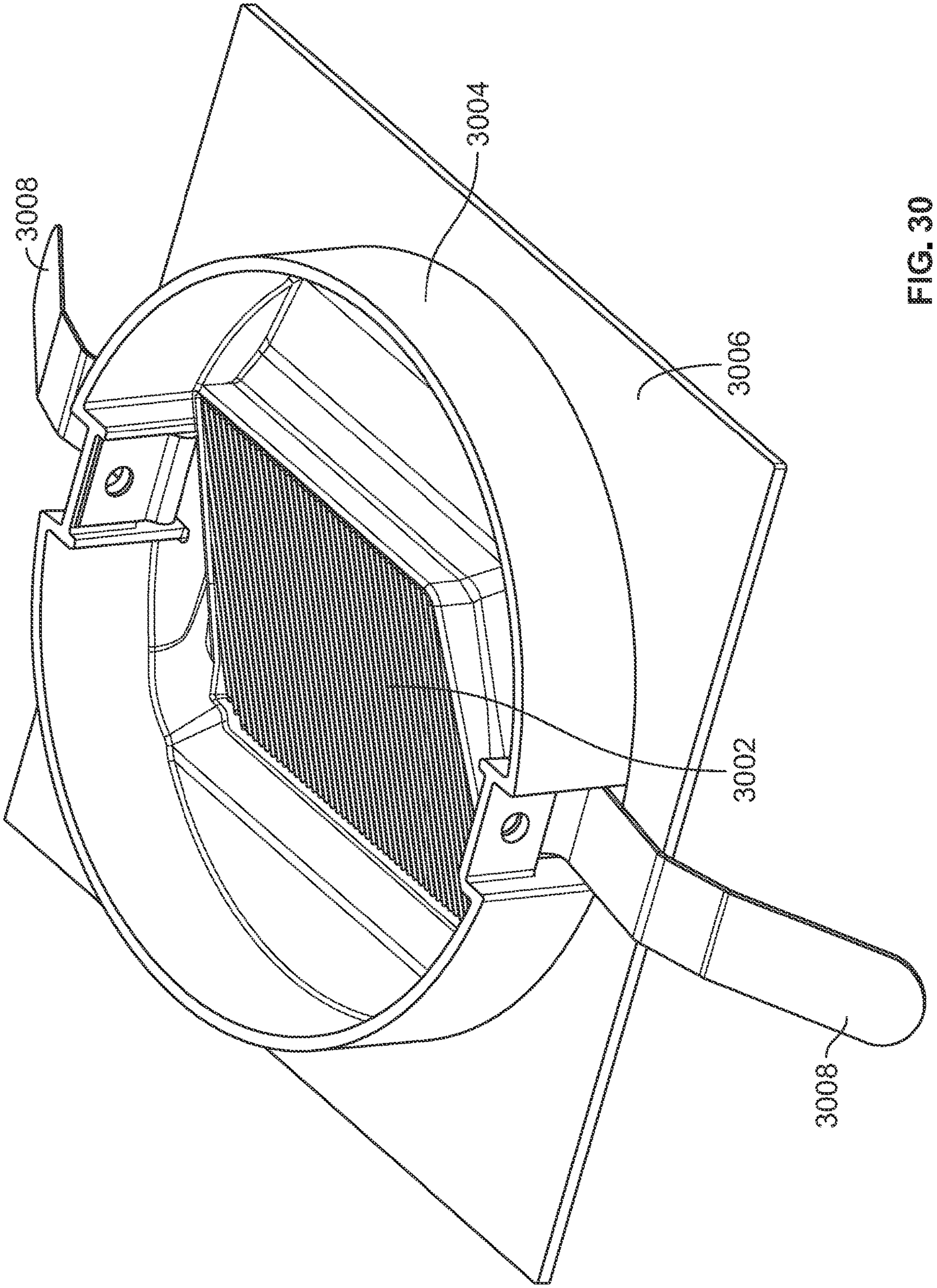
FIG. 30 shows schematically illustrative apparatus in accordance with the principles of the invention.

FIG. 30 shows wall wash trim 2904. Wall wash trim 2904 may include plate 3006. Plate 3006 may include collar 3004. Collar 3004 may be configured to prevent glare. Collar 3004 may include anchor tabs 3008. Anchor tabs 3008 may be used to connect wall wash trim 2904 to a housing such as housing 102 and 302. Wall wash trim 2904 may include reflector 3002. Reflector 3002 may include ridges. Reflector 3002 may be disposed on plate 3006 at an angle relative to plate 3006. The angle may enable light to be reflected to illuminate the desired surface.

Figure 31:
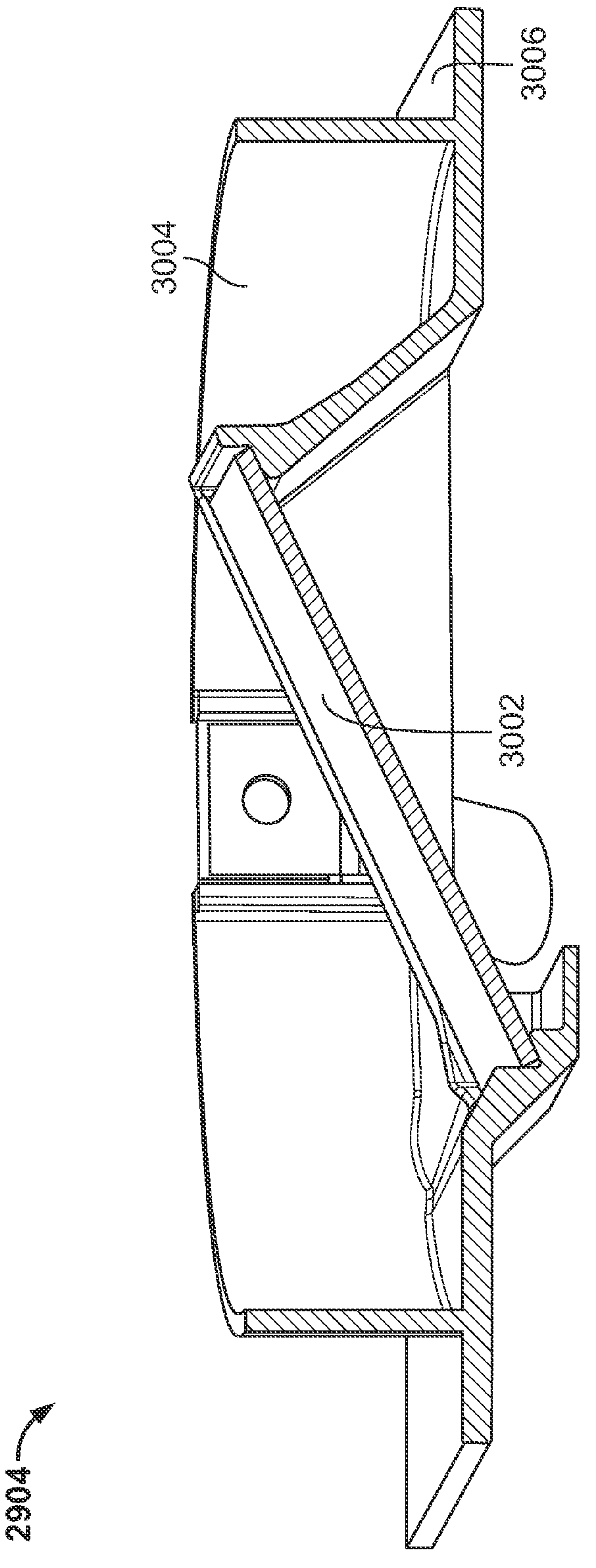
FIG. 31 shows schematically illustrative apparatus in accordance with the principles of the invention.

FIG. 31 shows a cross-sectional view of wall wash trim 2904.

Illustrative embodiments of apparatus and methods in accordance with the principles of the invention will now be described with reference to the accompanying drawings, which form a part hereof. It is to be understood that other embodiments may be utilized and that structural, functional and procedural modifications, additions or omissions may be made, and features of illustrative embodiments, whether apparatus or method, may be combined, without departing from the scope and spirit of the present invention.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10 that is, all subranges beginning with a minimum value of 1 or more (e.g. 1 to 6.1), and ending with a maximum value of 10 or less (e.g., 2.3 to 10.4, 3 to 8, 4 to 7), and finally to each number 1, 2, 3, 4, 5, 6, 7, 8, 9, and 10 contained within the range.

Thus, apparatus, methods and apparatus for lighting have been provided. Persons skilled in the art will appreciate that the present invention may be practiced by other than the described embodiments, which are presented for purposes of illustration rather than of limitation.

What is claimed is:

1. An apparatus for providing light, the apparatus comprising:

a retention body configured to be retained in a housing;

a rotatable body that:

along with the retention body, defines a central axis; and is configured to rotate relative to the retention body; and an articulating body that:

includes a light-emitting diode ("LED") light source; and is configured to:

tilt relative to the rotatable body; and slide along a curved surface of the rotatable body;

wherein the retention body:

includes a magnet; and is configured to be magnetically docked to the housing.

2. The apparatus of claim 1 wherein in operation:

the LED light source generates heat; and, the housing is configured to dissipate the heat.

3. The apparatus of claim 2 wherein the LED light source is configured such that when the LED light source is operated at a nominal operating power of no less than 10 W, the housing is configured to provide thermal dissipation such that a surface temperature of the housing does not exceed 90° C. when the housing is mounted in an architectural structure.

4. The apparatus of claim 2 wherein:

the LED light source has a nominal operating power of no less than 10 W; and, in operation, the housing is configured to dissipate the heat without additional thermal protection.

5. The apparatus of claim 4 wherein the additional thermal protection includes insulation.

6. The apparatus of claim 4 wherein the additional thermal protection includes an external casing.

7. The apparatus of claim 1 wherein:

the articulating body includes a first contact region that is in contact with the rotatable body;

the rotatable body includes a second contact region that is in contact with the retention body; and the retention body includes a third contact region that is in contact with the housing.

8. The apparatus of claim 7 wherein the articulating body includes a surface that is cylindrical.

9. The apparatus of claim 7 wherein the articulating body includes a surface that is spherical.

10. The apparatus of claim 7 wherein the articulating body includes a surface that is toroidal.

11. The apparatus of claim 7 wherein the curved surface of the rotatable body is converse a surface of the articulating body.

12. The apparatus of claim 11 wherein:

the rotatable body includes a keyway;

the articulating body includes a key; and the key is configured to slide along the keyway.

13. The apparatus of claim 7 wherein in operation:

the LED light source generates heat;

the articulating body:

receives the heat; and transfers the heat to the rotatable body across the first contact region;

the rotatable body:

receives the heat from the articulating body; and transfers the heat to the retention body across the second contact region; and the retention body:

receives the heat from the rotatable body; and transfers the heat to the housing across the third contact region.

14. The apparatus of claim 13 wherein a percentage of contact area between a second surface of the rotatable body and a surface of the retention body is configured to remain constant with rotation of the rotatable body.

15. The apparatus of claim 1 wherein:

the articulating body has a non-tilted state;

the articulating body has a maximum-tilted state; and tilting the articulating body from the non-tilted state to the maximum-tilted state reduces interfacial contact between the articulating body and the rotatable body by no more than a predetermined percentage.

16. The apparatus of claim 15 wherein when the articulating body is in the non-tilted state, the articulating body is disposed at a 0° angle relative to the central axis.

17. The apparatus of claim 15 wherein when the articulating body is in the maximum-tilted state the articulating body is disposed at a 30° angle relative to the central axis.

18. The apparatus of claim 15 wherein the articulating body is configured to tilt between 0° and 30° relative to the central axis.

19. The apparatus of claim 15 wherein when the articulating body is in the maximum-tilted state, the LED light source is configured to operate at an operating power of at least 16 W and the housing is configured to provide thermal dissipation such that a surface temperature of the housing does not exceed 90° C. when the housing is mounted in an architectural structure.

20. The apparatus of claim 1 wherein the retention body is configured to be removable from the housing.

21. The apparatus of claim 1 wherein the articulating body is configured to rotate along with the rotatable body.

22. The apparatus of claim 1 wherein the rotatable body is configured to rotate up to 360°.

23. The apparatus of claim 1 wherein the articulating body is articulatable by a user.

24. The apparatus of claim 1 wherein the rotatable body is rotatable by a user.

25. The apparatus of claim 1 wherein the LED light source is configured to be enclosed in the articulating body.

26. The apparatus of claim 1 wherein the housing is configured to be installed in a structure.

* * * * *